US011913282B2

(12) United States Patent
McKee

(10) Patent No.: US 11,913,282 B2
(45) Date of Patent: *Feb. 27, 2024

(54) ROLLER BLIND ASSEMBLY

(71) Applicant: Joseph S. McKee, Morganton, GA (US)

(72) Inventor: Joseph S. McKee, Morganton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,532

(22) Filed: Oct. 9, 2022

(65) Prior Publication Data

US 2024/0003184 A1 Jan. 4, 2024

Related U.S. Application Data

(63) Continuation-in-part of application No. 17/857,036, filed on Jul. 3, 2022.

(51) Int. Cl.
*E06B 9/24* (2006.01)
*E06B 9/72* (2006.01)
*E06B 9/44* (2006.01)
*F16D 11/14* (2006.01)
*E06B 9/68* (2006.01)

(52) U.S. Cl.
CPC .............. *E06B 9/72* (2013.01); *E06B 9/44* (2013.01); *E06B 2009/2494* (2013.01); *E06B 2009/6809* (2013.01); *F16D 11/14* (2013.01)

(58) Field of Classification Search
CPC ..... E06B 2009/2494; E06B 2009/2482; E06B 9/40; E06B 9/42; E06B 9/56; E06B 9/58; E06B 9/72; E06B 9/44; B60J 1/2083; B60J 1/2086; B60J 1/2025; B60J 1/2072; B60J 1/2013; B60J 1/2063; B60J 1/208; F16D 11/14

See application file for complete search history.

(56) References Cited

U.S. PATENT DOCUMENTS

| | | | | |
|---|---|---|---|---|
| 8,960,261 B1* | 2/2015 | Williams | ............... | B60J 1/2044 160/370.22 |
| 11,391,088 B2* | 7/2022 | McKee | ............... | E06B 9/42 |
| 2008/0041540 A1* | 2/2008 | Li | ............... | B60J 1/2052 160/370.22 |
| 2008/0223534 A1* | 9/2008 | Hansen | ............... | B60J 1/2086 160/370.22 |
| 2013/0255892 A1* | 10/2013 | Ojima | ............... | B60J 1/2083 160/266 |
| 2014/0318048 A1* | 10/2014 | Dison | ............... | E06B 9/24 52/203 |
| 2018/0334852 A1* | 11/2018 | Miroshnichenko | .... | B60J 1/2025 |

* cited by examiner

*Primary Examiner* — Daniel P Cahn
*Assistant Examiner* — Jeremy C Ramsey
(74) *Attorney, Agent, or Firm* — Incorporating Innovation LLC; Charlena Thorpe, Esq.

(57) ABSTRACT

Implementations of a roller blind assembly for angled architectural openings are provided. In some implementations, the roller blind assembly comprises a frame, a roller tube assembly, a roller blind sheet, a chain assembly, a track assembly, an extension assembly, an actuator and clutch assembly, and a motor assembly. In some implementations, a method of using the roller blind assembly comprises installing the roller blind assembly to fully fit the perimeter of an angled architectural opening and operating the roller blind assembly to fully cover the opening of the angled architectural opening.

14 Claims, 28 Drawing Sheets

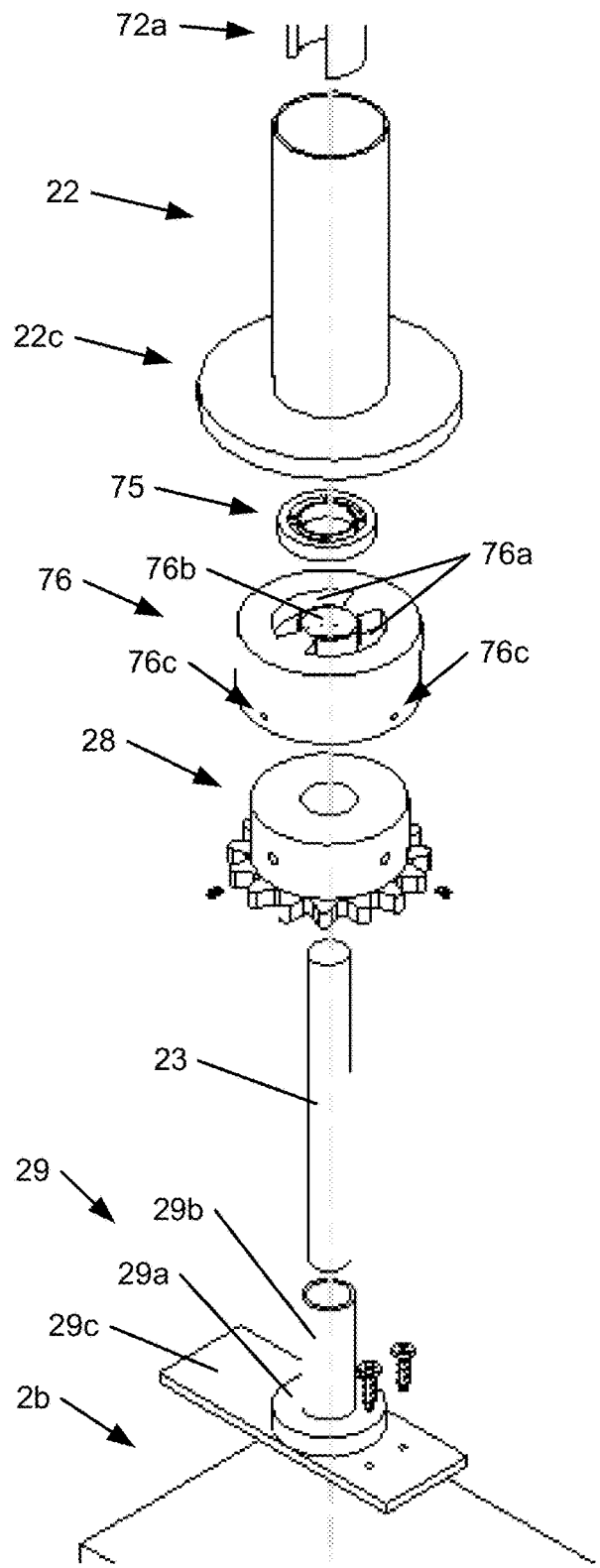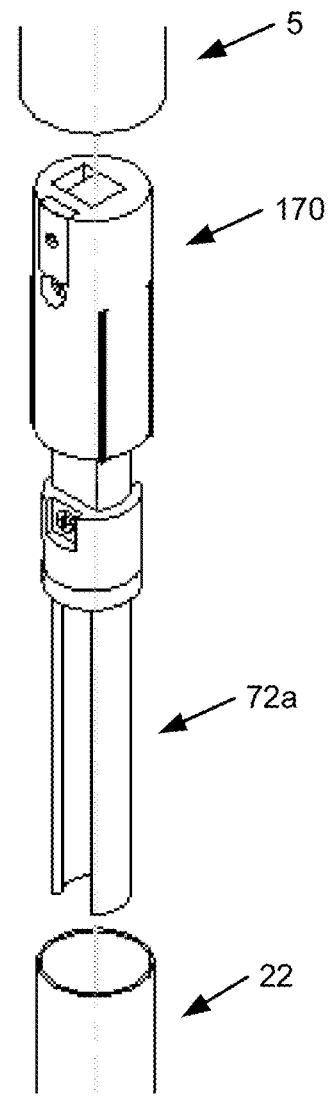
FIG. 7b
FIG. 7c

ROLLER BLIND ASSEMBLY

CROSS REFERENCE TO RELATED APPLICATION

This continuation-in-part application claims the benefit of U.S. patent application Ser. No. 17/857,036, which was filed on Jul. 3, 2022 claiming the benefit of U.S. patent application Ser. No. 16/381,040, which was filed on Apr. 11, 2019, each of which is incorporated herein by reference in its entirety.

TECHNICAL FIELD

This disclosure relates to implementations of a roller blind assembly for angled architectural openings.

BACKGROUND

Roller blinds are used to cover architectural openings, such as windows of a house, office building, or other structure. The roller blinds are used to provide shading, privacy, and/or other preferences by covering the architectural openings.

Roller blinds are designed to fit architectural openings by fitting around the perimeter or within the frame of the architectural openings. Roller blinds are designed to cover architectural openings by extending to fully cover the architectural openings. The roller blinds are also designed to retract to uncover the architectural openings.

Roller blinds include a roller and a sheet element. One end of the sheet element is attached to the roller. The sheet element rolls up around the roller when the roller blind is retracted. The sheet element unwinds and extends from the roller when the roller blind is extended. The sheet element is composed of a thin flexible material, such as fabric or plastic.

The roller of existing roller blinds is mounted at the top side of an architectural opening. Gravity assists to extend the sheet element downward as the sheet element is unwound from the roller. Gravity also assists to keep the unwound sheet element extended downward over the architectural opening. Thus, the weight of the sheet element, and in some designs an added weighting near the bottom end of the sheet element, is all that keeps the thin flexible sheet element extended over the architectural opening.

Existing roller blinds are rectangular shaped. Therefore, existing roller blinds are only able to fully fit and cover, as described above, rectangular shaped architectural openings. However, some architectural openings have a modified rectangular shape in which one side, such as the top or bottom side, of the architectural openings is angled so that this angled side is not parallel or perpendicular to the other sides. These architectural openings can be referred to as angled architectural openings.

Existing roller blinds are not able to fully fit and cover angled architectural openings, particularly when the angled side is at the top or bottom of the angled architectural openings. Furthermore, existing roller blinds can only properly extend and retract to fit and cover architectural openings when the roller is mounted at the top side of the architectural openings so that the sheet material extends vertically downward from the roller as described above. Therefore, existing roller blinds can not properly extend and retract to fit and cover architectural openings if the roller is mounted at the left or right side of the architectural openings so that the sheet material has to extend horizontally, such as to fit and cover angled architectural openings that have an angled top or bottom side.

BRIEF DESCRIPTION OF THE DRAWINGS

FIGS. 7a-7e illustrate various views of the roller tube assembly of the roller blind assembly according to the present disclosure.

DETAILED DESCRIPTION

Implementations of a roller blind assembly for angled architectural openings are provided. In some implementations, the roller blind assembly comprises a frame, a roller tube assembly, a roller blind sheet, a chain assembly, a track assembly, an extension assembly, an actuator and clutch assembly, and a motor assembly.

In some implementations, the roller blind assembly is configured to fully fit the perimeter of and also fully cover the opening of angled architectural openings.

In some implementations, the roller blind assembly is configured to extend, retract, and maintain the extension of a non-vertical roller blind such as a horizontally extending roller blind.

In some implementations, a method of using the roller blind assembly comprises installing the roller blind assembly to fully fit the perimeter of an angled architectural opening. In some implementations, the method comprises operating the roller blind assembly to fully cover the opening of the angled architectural opening.

Figure 1A:
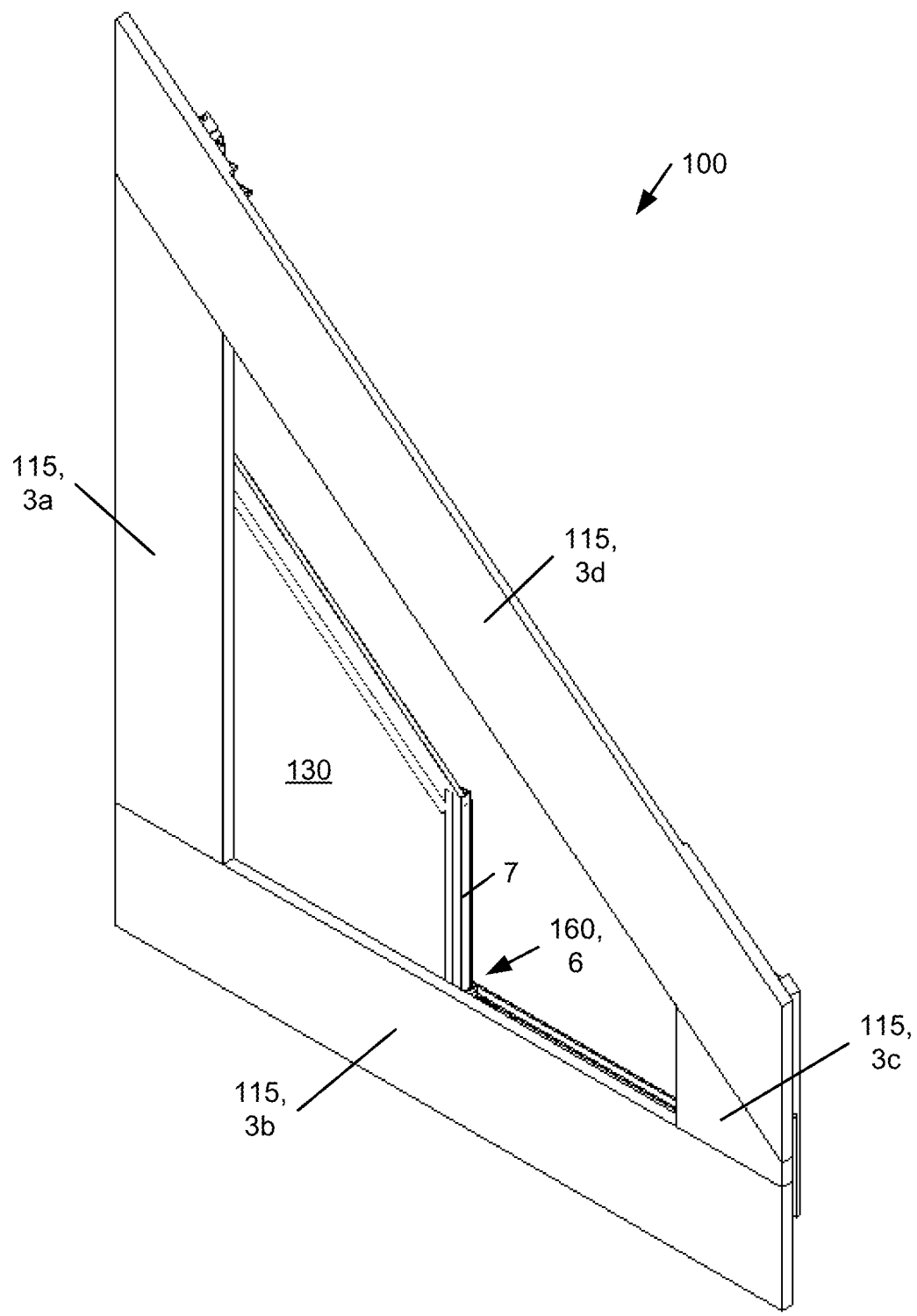
FIG. 1a illustrates a front side or interior side perspective view of an implementation of an example roller blind assembly according to the present disclosure with the roller blind sheet partially extended or retracted.
Figure 1B:
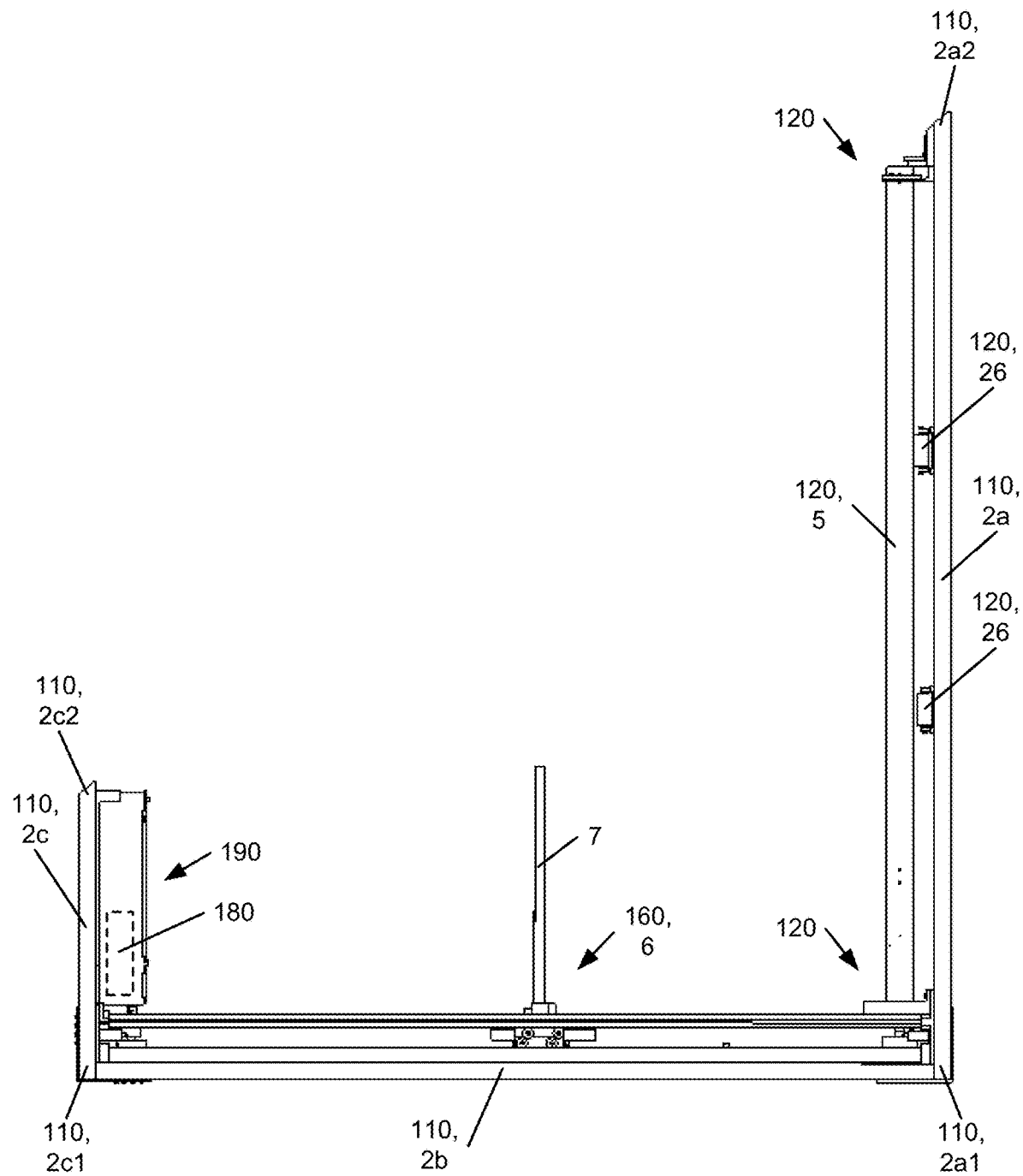
FIG. 1b illustrates a back side or exterior side view of the frame and other components of the roller blind assembly according to the present disclosure.
Figure 1C:
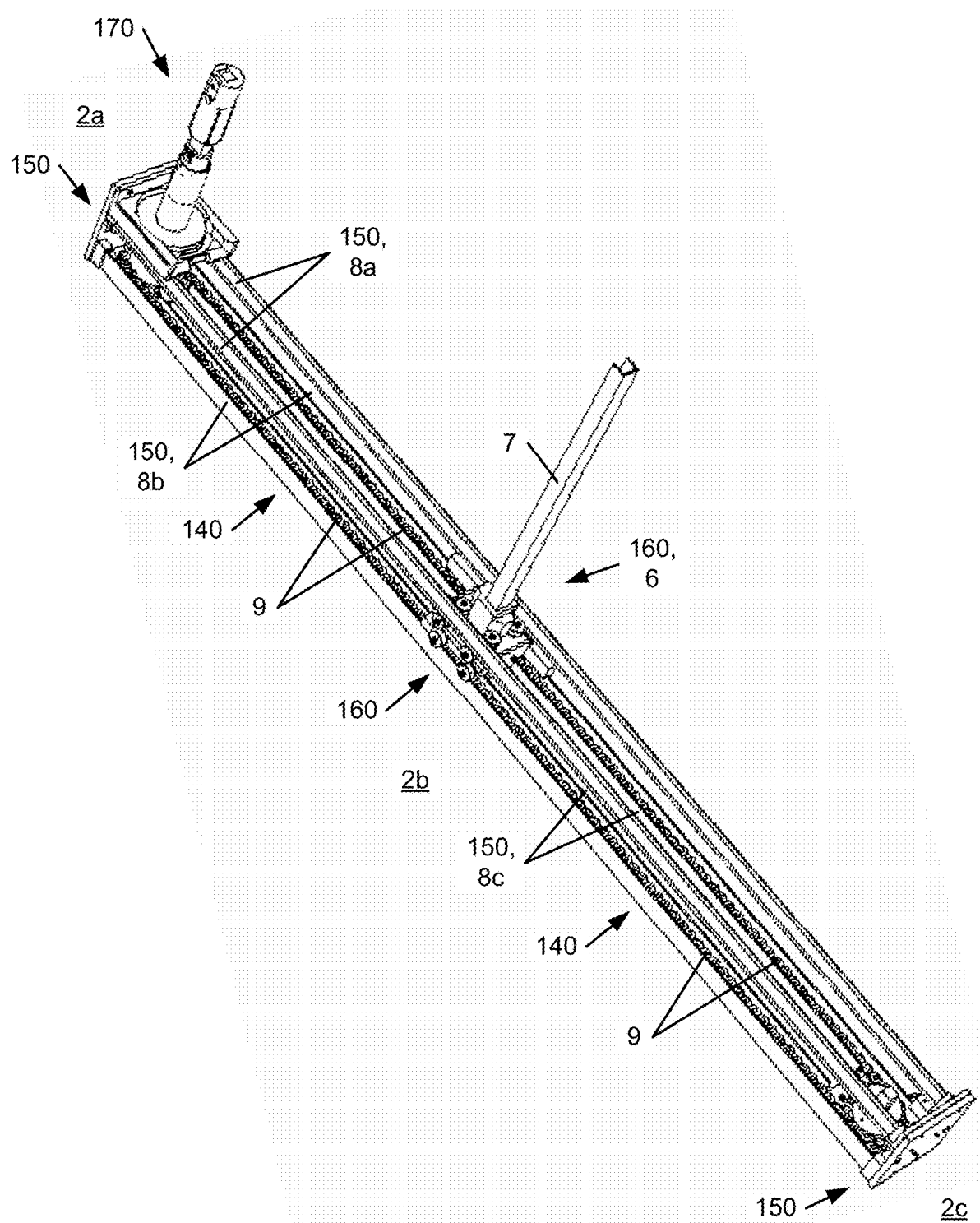
FIG. 1c illustrates a top side perspective view of the track assembly and other components of the roller blind assembly according to the present disclosure.

As shown in FIGS. 1a-1c, in some implementations, the roller blind assembly 100 comprises a frame 110, a roller tube assembly 120, a roller blind sheet 130, a chain assembly 140, a track assembly 150, an extension assembly 160, an actuator and clutch assembly 170, and a motor assembly 180.

In some implementations, the roller blind assembly 100 can fully fit the perimeter of a window having a modified rectangular shape. In some implementations, the roller blind assembly 100 can also fully cover the opening of the window having the modified rectangular shape.

In some implementations, the top side of the window having the modified rectangular shape extends diagonally downward from a first (e.g., left) side to a second (e.g., right) side of the window. In some implementations, the top side of the window is non-perpendicular to the first side and the second side of the window. In some implementations, the top side of the window is non-parallel to the bottom side of the window.

In some implementations, the foregoing features of the top side of the window can be switched to the bottom side of the window so that the bottom side of the window is "angled" instead of the top side.

Figure 19:
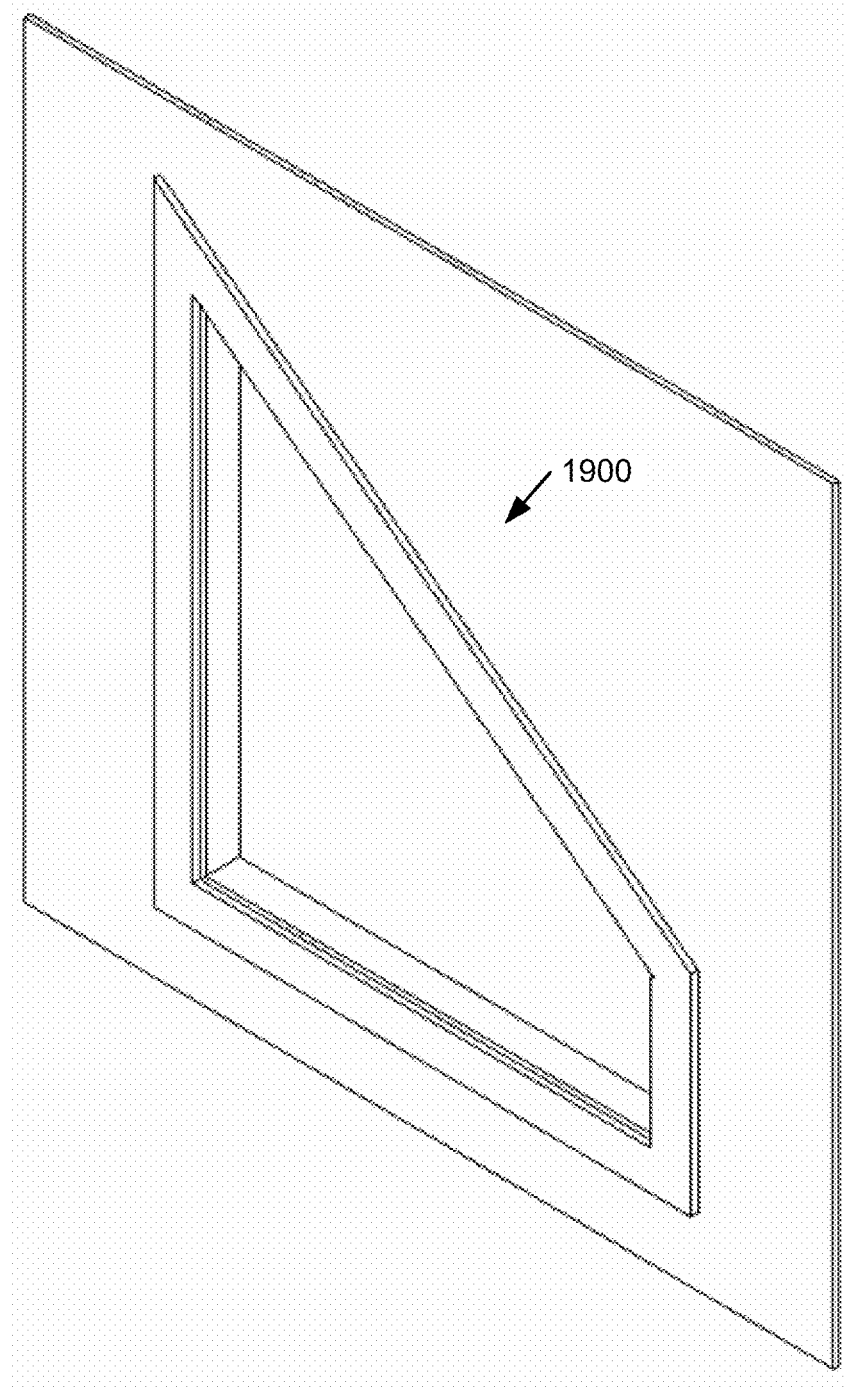
FIG. 19 illustrates a front side or interior side perspective view of an example angled architectural opening.

In some implementations, the above described window is an example of an angled architectural opening as referred to herein this description. In some implementations, an angled architectural opening as referred to herein is an architectural opening, such as a window (or window opening) of a house, office building, or other structure, that has a modified rectangular shape in which one side, such as the top or bottom side, is angled so that this angled side is not parallel or perpendicular to the other sides. In this regard, FIG. 19 illustrates a front side or interior side perspective view of an example angled architectural opening 1900.

As shown in FIG. 1B, in some implementations, the frame 110 comprises a first (e.g., left) side 2a, a bottom side 2b, and a second (e.g., right) side 2c. In some implementations, the first side 2a comprises a first side bottom end 2a1 and a first side top end 2a2. In some implementations, the second side 2c comprises a second side bottom end 2c1 and a second side top end 2c2.

In some implementations, the first side 2a extends vertically between the first side bottom end 2a1 and the first side top end 2a2. In some implementations, the second side 2c extends vertically between the second side bottom end 2c1 and the second side top end 2c2.

In some implementations, the bottom side 2b extends horizontally between and is connected respectively to the first side bottom end 2a1 and the second side bottom end 2c1.

In some implementations, the frame 110 may further comprise a top side (not shown) that extends between the first side top end 2a2 and the second side top end 2c2.

In some implementations, the first side 2a is longer than the second side 2c.

In some implementations, the combination of the first side 2a, the bottom side 2b, and the second side 2c corresponds to the modified rectangular shape of the window so that the frame 110 can fully fit the perimeter of the window.

For example, in some implementations, the shape of the frame 110 defined by the sides 2a, 2b, 2c corresponds to the modified rectangular shape of the window by the first side 2a of the frame 110 coextending with the first side of the window, the second side 2c of the frame 110 coextending with the second side of the window, and the bottom side 2b of the frame 110 coextending with the bottom side of the window.

In some implementations, the frame 110 is sized to fit to an existing frame of any other suitable angled architectural opening.

As shown in FIGS. 1b and 1c, in some implementations, as described below, the roller tube assembly 120, the chain assembly 140, the track assembly 150, and the motor assembly 180 are attached to the frame 110 within an interior of the frame 110. In some implementations, the interior of the frame 110 extends between the first side 2a, the bottom side 2b, and the second side 2c of the frame 110.

In some implementations, other components of the roller blind assembly 100 may also be attached within the interior of the frame 110.

Figure 4:
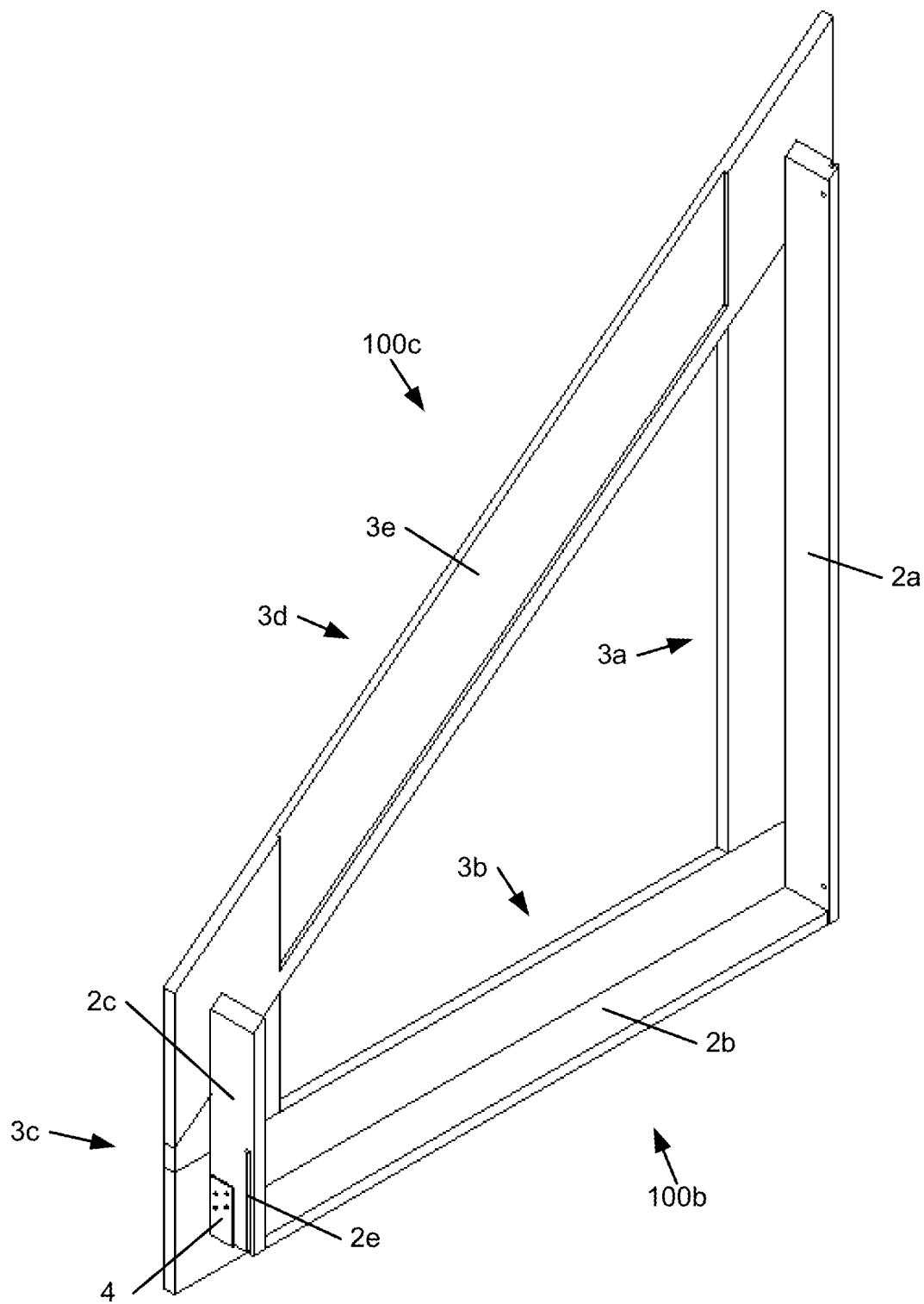
FIG. 4 illustrates a back side or exterior side perspective view of the frame and the outer frame of the roller blind assembly according to the present disclosure.
Figure 5:
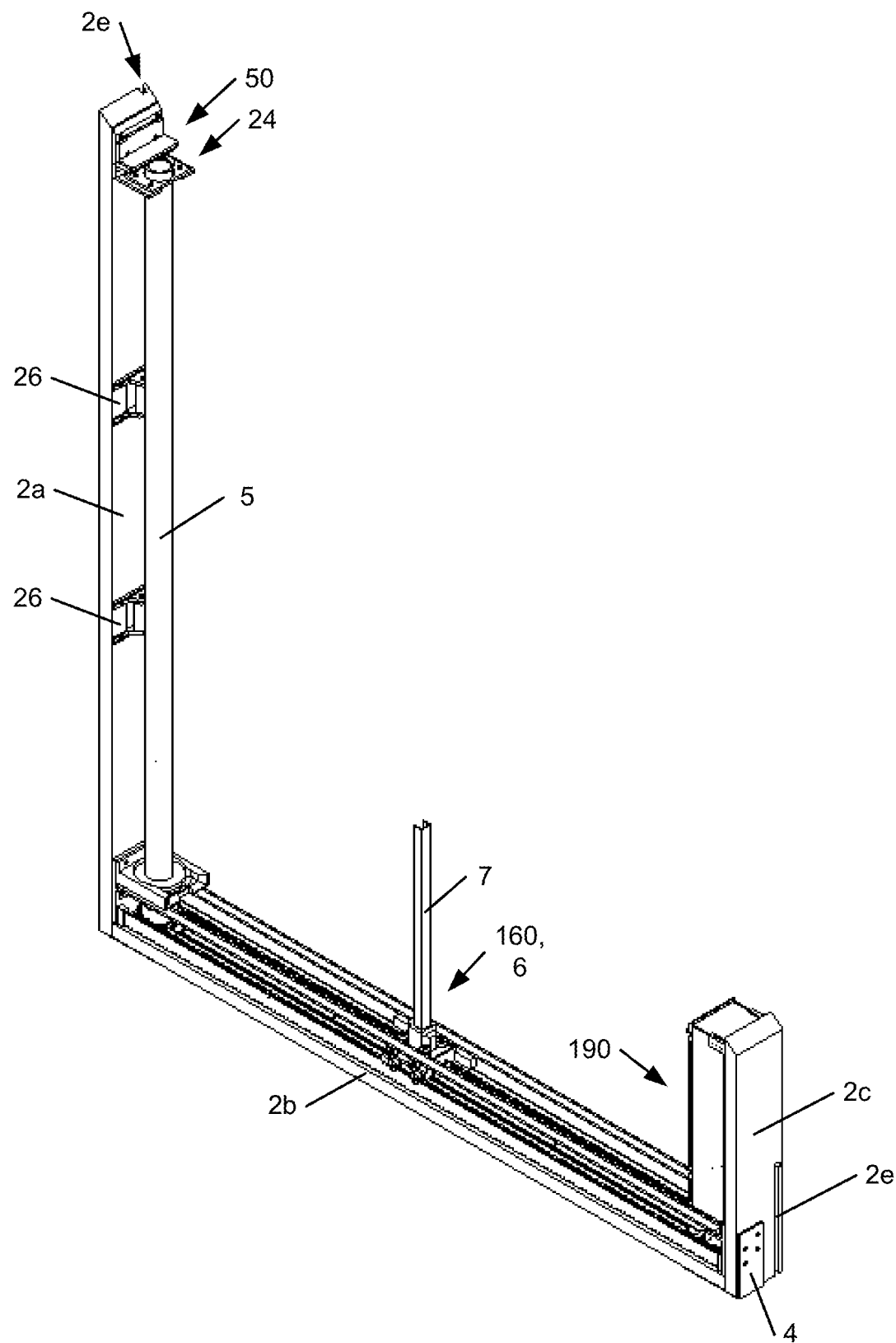
FIG. 5 illustrates a front side or interior side view of the frame and other components of the roller blind assembly according to the present disclosure.

As shown in FIGS. 4 and 5, in some implementations, the first side 2a, the bottom side 2b, and the second side 2c of the frame 110 are each at least partially or substantially rectangular beam shaped. In some implementations, the sides 2a, 2b, 2c can be any other suitable shape.

As shown in FIGS. 4 and 5, in some implementations, wire channels 2e are cut into the outside of the sides 2a, 2b and 2c of the frame 110. In some implementations, the wire channels 2e provide a clean way (e.g., efficient, unobstructing, etc.) to run electrical wiring (wires) for the roller blind assembly 100 around the exterior of the frame 110.

In some implementations, there are also holes through the frame 110 at various locations to provide paths for wires to travel from the inside to the outside of the frame 110 and vice versa.

Figure 6:
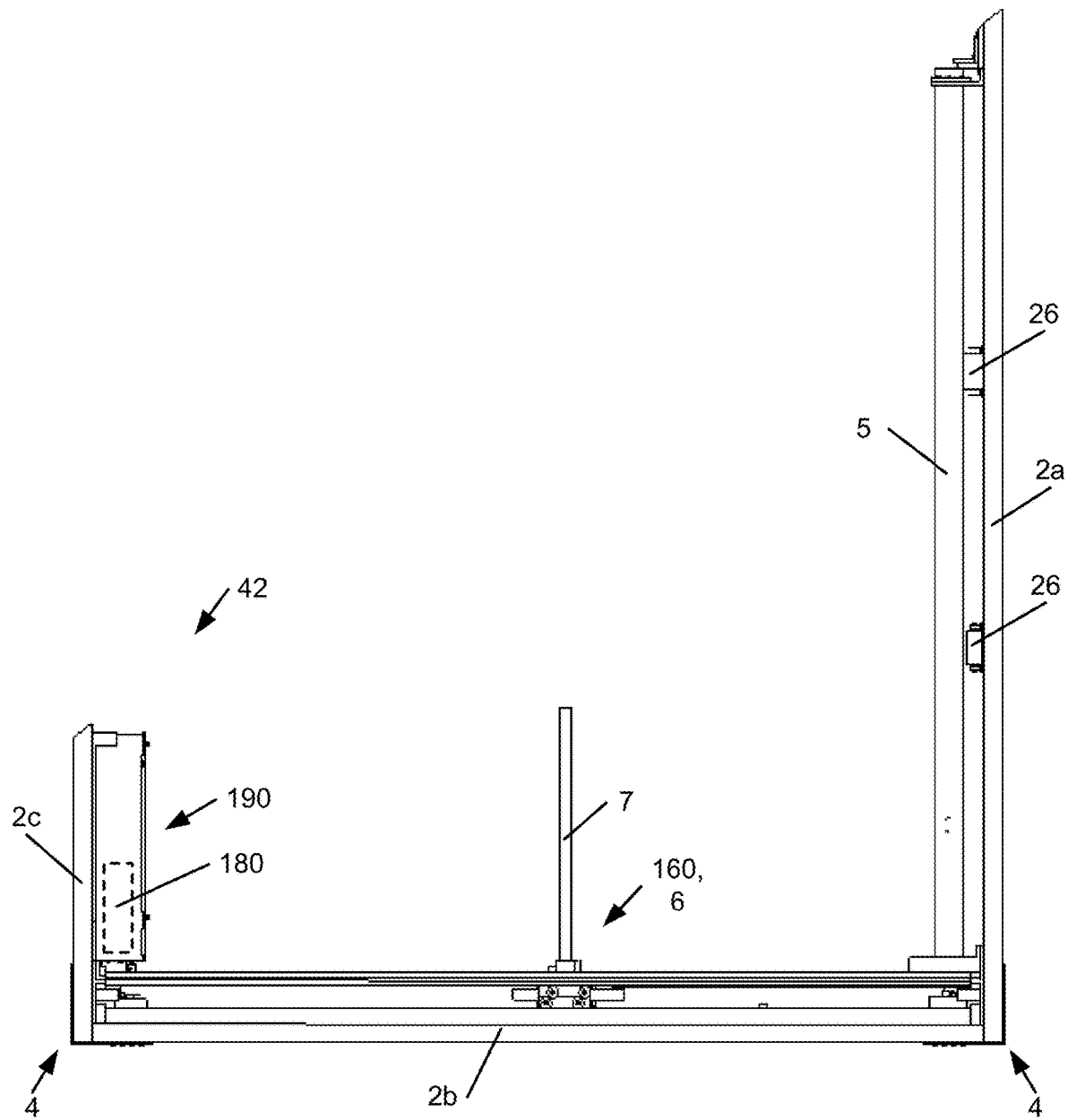
FIG. 6 illustrates another back side or exterior side view of the frame and other components of the roller blind assembly according to the present disclosure.

As shown in FIGS. 4-6, in some implementations, hardware angle brackets 4 may be used to maintain the shape of the frame 110. In some implementations, the brackets 4 may be used to connect the first frame side 2a and the bottom frame side 2b. In some implementations, the brackets 4 may be used to connect the bottom frame side 2b and the second frame side 2c.

In some implementations, the brackets 4 may be connected to the frame sides 2a, 2b, 2c with screws or similar fasteners. In some implementations, the screws may be long enough to help maintain a solid structural shape of the frame sides 2a, 2b, 2c. In some implementations, the screws may not extend all of the way through the frame sides 2a, 2b, 2c and therefore may not be exposed in a top view of the frame 110.

In some implementations, alternate references may be used herein with respect to the frame sides 2a, 2b, 2c, or similar elements, such as retracted side 2a and extended side 2c. However, it should be understood that such references refer to the same respective elements or other relative aspects based on the same reference number used. For example, in some implementations described herein, the first side 2a and the retracted side 2a refer to the same element.

Furthermore, retracted side or similar retracted references refer to the side on which the roller blind sheet 130, described below, approaches or positions when fully retracted, e.g. the frame first side 2a with respect to the disclosure herein. Similarly, extended side or similar extended references refer to the side on which the roller blind sheet 130 approaches or positions when fully extended, e.g. the frame second side 2c with respect to the disclosure herein.

As shown in FIG. 1a, in some implementations, the roller blind assembly 100 further comprises an outer molding or "outer frame" 115. In some implementations, the outer frame 115 comprises an outer first (e.g., left) side 3a, an outer second side 3c, an outer top side 3d, and an outer bottom side 3b.

In some implementations, the combination of the sides 3a, 3b, 3c, 3d of the outer frame 115 form a modified rectangular shape. In some implementations, the modified rectangular shape is substantially congruent in length along each side to the length along each corresponding side 2a, 2b, 2c of the frame 110 of the roller blind assembly 100.

For example, in some implementations, the sides 3a, 3b, 3c, 3d are connected together respectively to form a modified rectangular shape so that the outer first side 3a coextends with the first side 2a of the frame 110, the outer second side 3c coextends with the second side 2c of the frame 110, and the outer bottom side 3b coextends with the bottom side 2b of the frame 110.

In some implementations, the outer frame 115 is attached to the frame 110 along each corresponding side 2a, 2b, 2c of the frame 110 respectively.

For example, in some implementations, the outer frame 115 is attached to the frame 110 so that the outer first side 3a is adjacent to the first side 2a of the frame 110, the outer second side 3c is adjacent to the second side 2c of the frame 110, and the outer bottom side 3b is adjacent to the bottom side 2b of the frame 110.

In some implementations, the outer frame 115 at least partially conceals the other components of the roller blind assembly 100 that are attached or adjacent to the frame 110. As shown in FIG. 1a, in some implementations, the outer frame 115 at least partially conceals the other components when the roller blind assembly 100 is viewed toward the direction in which the outer frame 115 is attached to the frame 110.

Figure 3:
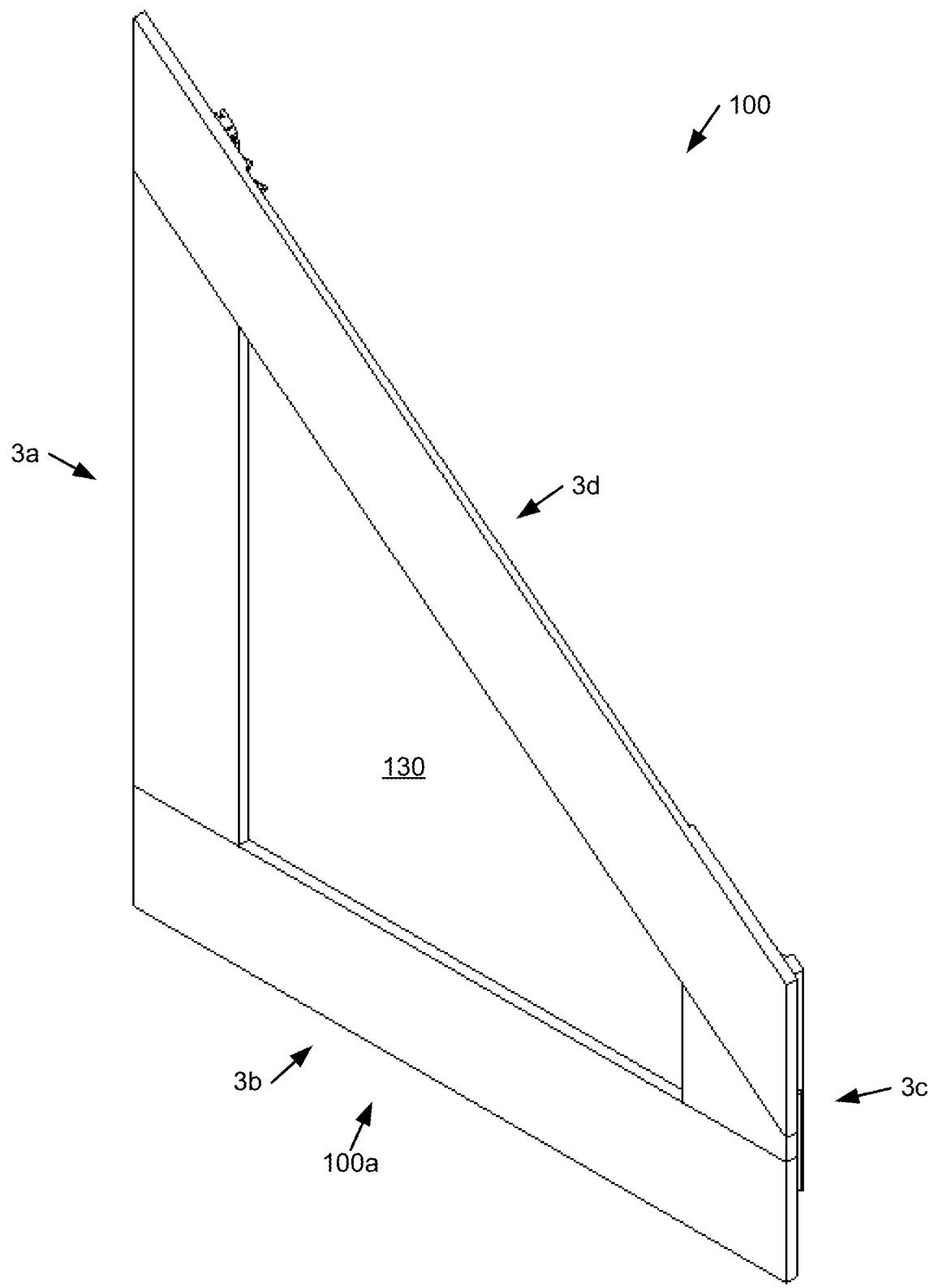
FIG. 3 illustrates another front side or interior side perspective view of the roller blind assembly according to the present disclosure with the roller blind sheet fully extended.

As shown in FIGS. 3 and 4, in some implementations, the outer frame sides 3a, 3b, 3c, 3d minimize the visibility of components of the roller blind assembly 100 from a viewer on the interior side 100a of the assembly 100. In some implementations, the outer frame sides 3a, 3b, 3c, 3d provides for a transition between the roller blind assembly 100 and existing framework or molding around an angled architectural opening.

In some implementations, the materials, decorative design, staining or painting colors, and/or sheen of the outer frame sides 3a, 3b, 3c, 3d can be modified to match or complement the existing framework or molding of the angled architectural opening.

In some implementations, the sizing of the outer frame sides 3a, 3b, 3c, 3d is based on the amount of coverage required to minimize the visibility of the assembly 100 components from an interior viewpoint. In some implementations, the sizing of the outer frame sides 3a, 3b, 3c, 3d is based on the desired amount of molding for a transition to the existing framework or molding on the angled architectural opening.

In some implementations, the top outer frame side 3d also provides a path for heat to escape from the exterior side 100b of the roller blind assembly 100 out of the top side 100c of the assembly 100. As shown in FIG. 4, in some implementations, a cutout 3e is cut in the top outer frame side 3d to provide this path.

In some implementations, the cutout 3e runs most or all of the length of a top portion of the top outer frame side 3d. In some implementations, the cutout 3e runs from the very top of the top outer frame side 3d down to a point below the top framework or molding of the angled architectural opening (not shown).

In some implementations, heat that builds on the exterior side 100b of the roller blind sheet 130 rises toward the top side 100c of the roller blind assembly 100. In some implementations, when the heat rises to the existing molding or framework of the angled architectural opening, the heat can escape through the cutout 3e and out of the top side 100c of the assembly 100.

In some implementations, the heat can escape since the cutout 3e is cut to a point below the point of contact between the top outer frame side 3d and the existing molding or framework of the angled architectural opening. In some implementations, this flow path of heat through the cutout 3e minimizes the potential for damage caused by heat or the expansion of gasses to any material used to separate the interior from the exterior of the angled architectural opening, such as glass.

As introduced above, in some implementations, the frame 110 may further comprise a top side (not shown). In some implementations, such added top side includes a sufficient ventilation path for the escape of heat out of the top of the roller blind assembly 100.

In some implementations, this ventilation flow path is aligned with the cutout 3e in the optional outer frame 115 of the assembly 100. In some implementations, the ventilation flow path allows heat and heated gasses to escape from the exterior side 100b of the roller blind sheet 130 as described in the foregoing.

In some implementations, the roller blind assembly 100 may be rotated bottom side 2b up for use in an angled architectural opening with an angled bottom side instead of an angled top side. In some implementations, for such rotated assembly 100, the cutout 3e is repositioned on the bottom outer frame side 3b instead of the top outer frame side 3d.

In some implementations, the repositioned cutout 3e is started from above the point where the bottom outer frame side 3b meets the bottom frame side 2b. In some implementations, this change in the design of the cutout 3e allows for the escape of heat and gases from the exterior side of the roller blind sheet 130 for such rotated assembly 100.

As shown in FIG. 1B, in some implementations, the roller tube assembly 120 comprises a cylindrical tube 5. In some implementations, the roller tube assembly 120 is attached to the frame 110.

In some implementations, the tube 5 extends vertically adjacent to the first side 2a of the frame 110. In some implementations, the tube 5 is rotatably attached to the frame 110. In some implementations, the tube 5 is rotatable about the longitudinal center of the tube 5.

As shown in FIGS. 5 and 6, in some implementations, the roller tube 5 may be a hollow tube or pipe. In some implementations, the roller tube 5 may be cut slightly longer than the height of the roller blind sheet 130. In some implementations, the roller tube 5 is cut to allow for a place where the roller tube top bracket 24 can maintain the position of the roller tube 5 without interfering with the roller blind sheet 130.

In some implementations, the roller tube 5 can be a solid bar that is modified at the bottom side to accept the roller tube bottom attachment 22, the actuator and clutch assembly 170, and related wires, described below.

In some implementations, the roller tube 5 is held in place in a vertical alignment. In some implementations, the roller tube 5 is held along the frame retracted side 2a of the roller blind assembly 100. In some implementations, the bottom side of the roller tube 5 is connected to a roller tube bottom attachment 22.

Figure 7A:
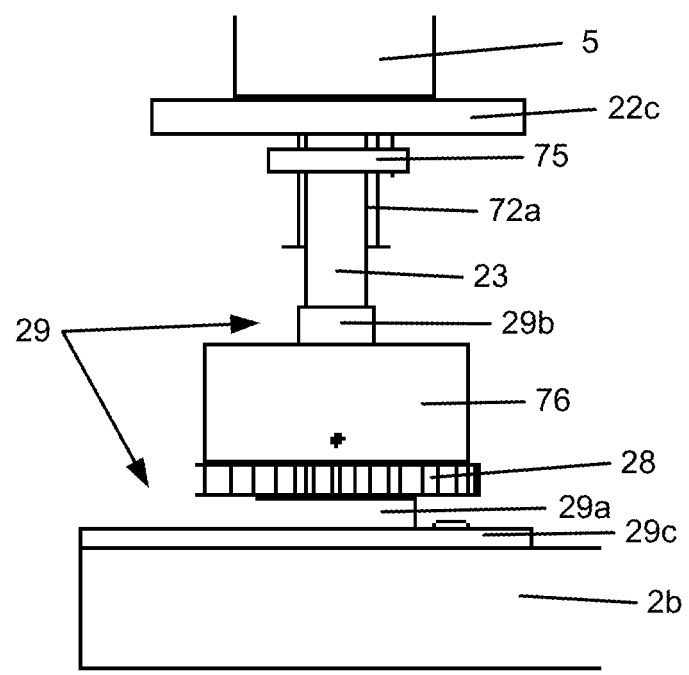

As shown in FIGS. 7a and 7b, in some implementations, the roller tube assembly 120 comprises a retracted side sprocket bracket 29. In some implementations, the retracted side sprocket bracket 29 is connected to the bottom frame side 2b in any suitable way, such as by screws.

As shown in FIGS. 7a and 7b, in some implementations, the retracted side sprocket bracket 29 comprises a flange 29c. In some implementations, the flange 29c is configured (e.g., sized, shaped, etc.) to fit in a cutout 12e on the retracted side track bracket 12 (described below for FIGS. 13c and 13d).

In some implementations, the flange 29c is also configured to place the sprocket 28 in a location where it does not interfere with other components of the roller blind assembly 100 but is also aligned with the roller tube 5.

In some implementations, fitting the flange 29c in the cutout 12e on the retracted side sprocket bracket 29 makes it easier to center the bracket 29 on the bottom frame side 2b (e.g., during manufacturing of the roller blind assembly 100).

As shown in FIGS. 7a and 7b, in some implementations, the retracted side sprocket bracket 29 comprises a raised section 29a that functions like a bushing. In some implementations, the sprocket sits on this raised section 29a which prevents the sprocket and chain from interfering with the frame base 2b and the sprocket bracket itself 29.

As shown in FIGS. 7a and 7b, in some implementations, the retracted side sprocket bracket 29 also comprises a hollow center raised section 29b. In some implementations, the interior of the hollow center raised section 29b is configured such that the shade roll bottom rod 23 of the roller tube assembly 120 (described more below) can be supported inside the retracted side sprocket bracket 29.

In some implementations, the exterior of the hollow center raised section 29b is configured to fit inside the center hole of the sprocket 28 and the sprocket cover 76 and to allow these components 28, 76 to spin freely around the hollow center raised section 29b.

Figure 7D:
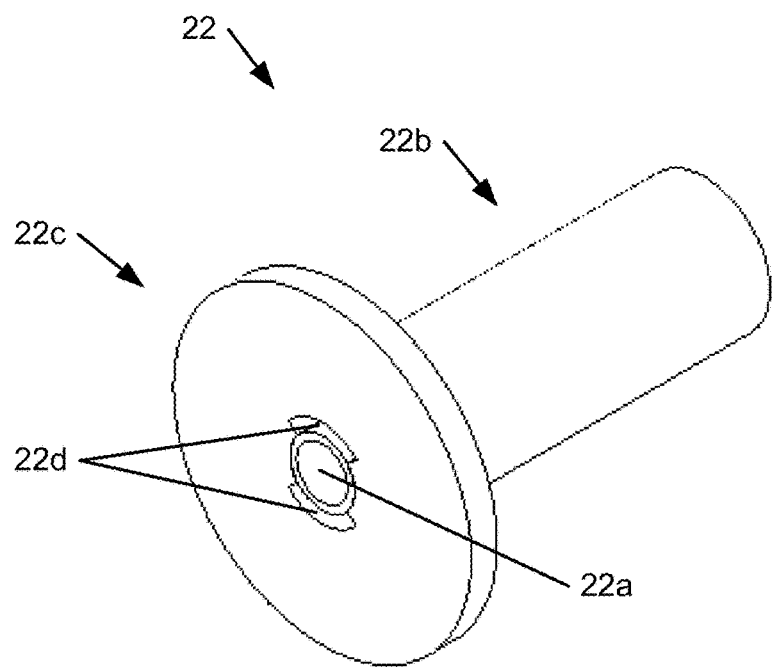
Figure 7E:
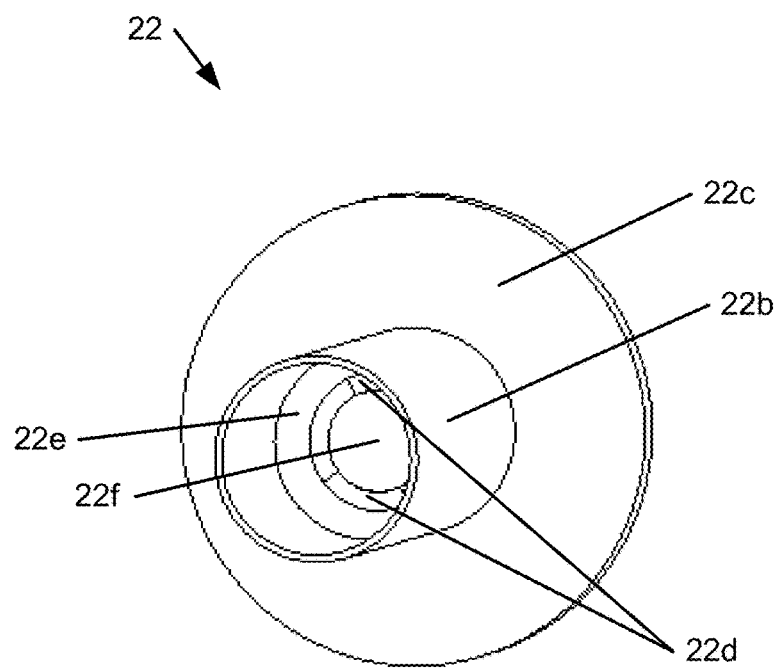

As shown in FIGS. 7a and 7b, in some implementations, the roller tube assembly 120 comprises a shade roll bottom rod 23. As shown in FIGS. 7d and 7e, in some implementations, the bottom attachment 22 comprises an opening 22a configured to receive and/or house the shade roll bottom rod 23 therein.

In some implementations, the bottom attachment 22 also comprises a cap 22f. In some implementations, the cap 22f caps the opening 22a such that the bottom attachment 22 sits on the shade roll bottom rod 23. In some implementations, this provides sufficient support for the roller tube 5 and the roller blind sheet 130.

As shown in FIGS. 7d and 7e, in some implementations, the roller tube bottom attachment 22 comprises a top section 22b. In some implementations, the attachment top section 22b is configured to fit snuggly inside the hollow center of the roller tube 5.

In some implementations, the attachment top section 22b is hollow such that it allows the actuator and clutch assembly 170 to extend, retract, and interact with the sprocket cover 76.

In some implementations, the roller tube bottom attachment 22 also comprises cutouts 22d that are shaped like the cross section of the clutch teeth 72a.

In some implementations, the clutch teeth 72a extend from the actuator 70 and clutch attachment 73, through the bottom assembly 22, 22d.

As shown in FIG. 7e, in some implementations, the bottom attachment 22 also comprises a sloped section 22e above the cutouts 22d. In some implementations, the sloped section 22e makes it easier to slide the bottom attachment 22 into the roller tube 5 with the actuator and clutch assembly 170 already installed in the roller tube 5.

In some implementations, as the bottom attachment 22 is installed into the roller tube 5, the clutch teeth 72a, which extend beyond the bottom edge of the roller tube 5, are slid into the bottom attachment top section 22b through the cutouts 22d. In some implementations, the sloped section 22e helps slide the clutch teeth 72a into the cutouts 22d during the installation.

In some implementations, the connection between the roller tube 5 and the bottom attachment 22 at the top section 22b can be made in many ways, such as by a friction fit, adhesive, screw(s), nail(s), compression fit, or set screw(s).

In some implementations, the roller tube bottom attachment 22 connects to the bottom side of the roller tube 5 so that the bottom attachment 22 and the roller tube 5 both rotate together. In some implementations, rotation by the roller tube 5 causes the bottom attachment 22 to rotate in unison at the same angular velocity. Similarly, in some implementations, rotation by the bottom attachment 22 causes the roller tube 5 to rotate in unison at the same angular velocity.

As shown in FIGS. 7a and 7b, in some implementations, the roller tube bottom attachment 22 comprises a flange 22c. In some implementations, the flange 22c extends outward from the center of the bottom attachment 22.

In some implementations, the flange 22c is located on the bottom attachment 22. In some implementations, the flange 22c is located below the point where the top section 22b of the bottom attachment 22 extends into the roller tube 5.

In some implementations, the flange 22c is configured to at least extend to the diameter of the roller blind sheet 130 when it is retracted and rolled onto the roller tube 5.

In some implementations, the flange 22c provides a shelf support to the bottom of the roller blind sheet 130 when it is rolled onto the roller tube 5. In some implementations, the shelf support provided by the flange 22c prevents the roller blind sheet 130 from falling from the roller tube 5.

In some implementations, the shelf support provided by the flange 22c prevents the roller blind sheet 130 from interfering with other parts of the roller blind assembly 100.

As shown in FIGS. 5 and 6, in some implementations, the top of the roller tube 5 is held in place by a roller tube top bracket 24. In some implementations, the top bracket 24 is connected to the frame retracted side 2a near the top of the roller tube 5.

In some implementations, the top bracket 24 can be connected to the frame retracted side 2a in various ways, such as by screw(s), nail(s), or adhesive.

In some implementations, the top bracket 24 is positioned high enough on the roller tube 5 to prevent any interference with the roller blind sheet 130.

In some implementations, the top bracket 24 comprises a cylindrical opening that fits around the roller tube 5. In some implementations, the roller tube 5 can rotate freely inside this cylindrical opening with very little friction or resistance from the roller tube top bracket 24.

In some implementations, the top bracket 24 prevents the top of the roller tube 5 from moving away from the top bracket 24.

Figure 8A:
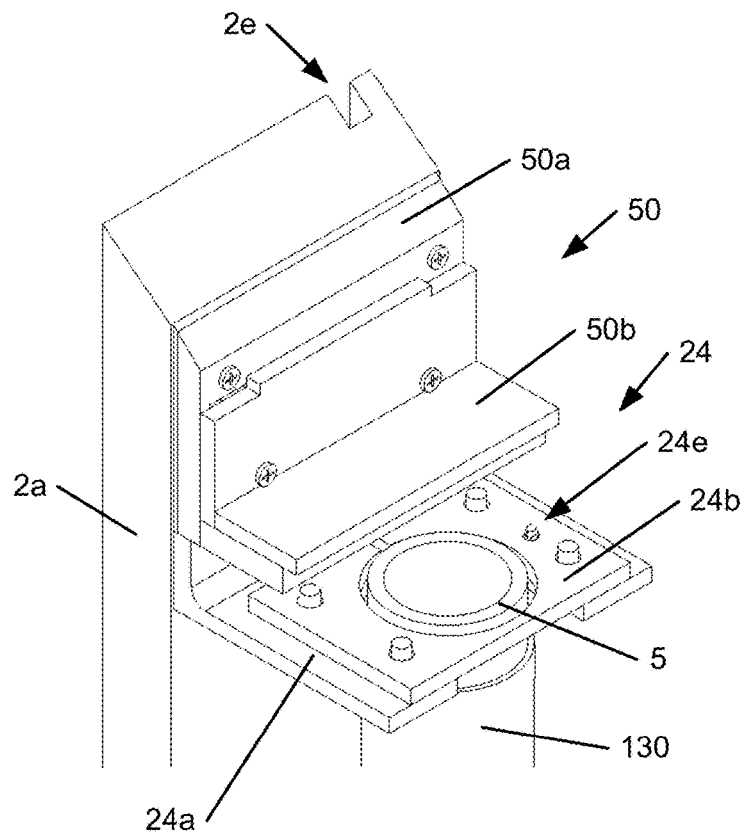
FIGS. 8a-8c illustrate views of the roller tube top bracket and the actuator wire housing of the roller blind assembly according to the present disclosure.
Figure 8B:
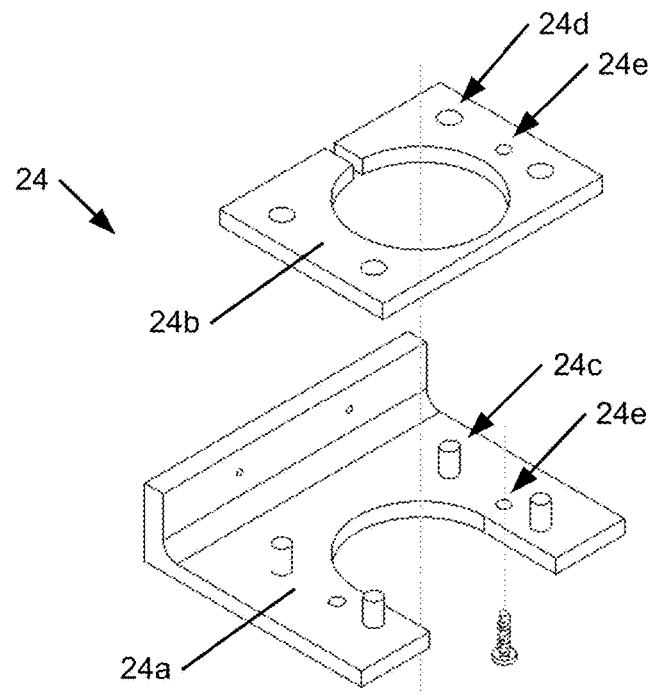

As shown in FIGS. 8a and 8b, in some implementations, the top bracket 24 comprises two sections 24a, 24b. In some implementations, the sections 24a, 24b can be connected and separated for ease of installation or removal of the roller tube 5 from the roller blind assembly 100.

In some implementations, the first or stationary section 24a comprises a cutout portion. In some implementations, the cutout is wide enough to allow the top portion of the roller tube 5 to slide out of the top bracket 24. In some implementations, the cutout allows the roller tube 5 to slide out of the top bracket 24 when the second or removable section 24b is separated from the stationary section 24a.

As shown in FIG. 8b, in some implementations, the stationary section 24a comprises multiple extensions 24c. In some implementations, the extensions 24c fit snuggly into holes 24d in the removable section 24b. In some implementations, the extensions 24c hold the removable section 24b in place and prevent movement away from the top bracket 24.

In some implementations, the extensions 24c fit snuggly enough in the holes 24d to prevent separation of the removable section 24b from the stationary section 24a, such as during operation of the roller blind assembly 100.

In some implementations, the removable section 24b can be attached to the stationary section 24a to assemble the bracket 24 in various ways, such as by screws, nuts and bolts, adhesive, or hinges.

As shown in FIGS. 8a and 8b, in some implementations, the stationary section 24a and the removable section 24b also comprise a screw hole 24e. In some implementations, the screw hole 24e is configured to receive a screw therein to attach the removable section 24b to the stationary section 24a.

As introduced above, in some implementations, the roller blind assembly 100 may be rotated bottom side 2b up for use in an angled architectural opening with an angled bottom side instead of an angled top side. In some implementations, for such rotated assembly 100, an additional bracket (not shown) is mounted at the top side of the roller tube 5. In some implementations, this additional bracket is connected to the frame retracted side 2a similar to how the top bracket 24 is connected to the frame retracted side 2a.

In some implementations, such additional bracket comprises a shelf portion (not shown). In some implementations, this shelf portion is positioned at the top side of the roller tube 5. In some implementations, this shelf portion prevents the roller tube 5 from being pulled downward, e.g. by gravity, from the rotated assembly 100.

In some implementations, for such rotated assembly 100, the top bracket 24 is rotated so that the removable section 24b positions on top of the stationary section 24a.

As shown in FIGS. 1b, 5, 6, and 9, in some implementations, the roller tube assembly 120 further comprises one or more (e.g., two) roller sheet guides 26 ("guide 26" or "guides 26").

Figure 9:
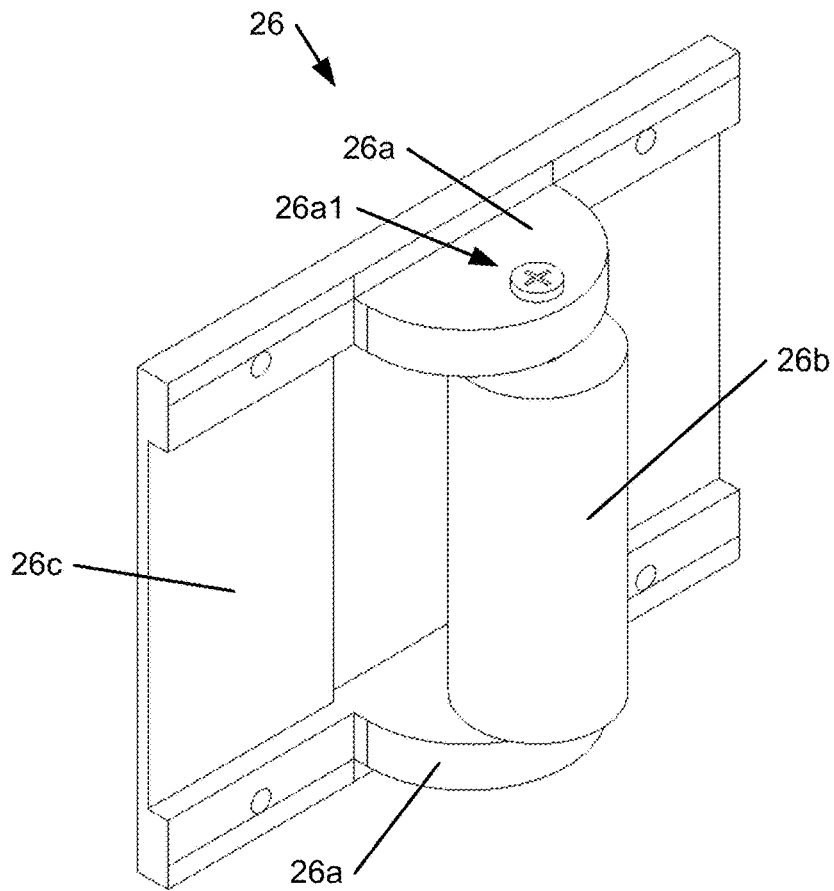
FIG. 9 illustrates a perspective view of the roller sheet guide of the roller blind assembly according to the present disclosure.

As shown in FIG. 9, in some implementations, the roller sheet guide 26 comprises flanges 26a, 26c, and a roller 26b. In some implementations, the flanges 26c allow the guide 26 to be connected to the frame retracted side 2a. In some implementations, the flanges 26a are connected to the flanges 26c.

In some implementations, the roller 26b comprises a loose hollow center. In some implementations, the flanges 26a comprise a screw 26a1 inserted therethrough into the loose hollow center of the roller 26b.

In some implementations, the loose hollow center of the roller 26b is small enough that the screw 26a1 maintains the roller 26b in place on the roller sheet guide 26 but large enough to allow the roller 26b to spin freely.

In some implementations, the guide 26 is attached to the first side (or retracted side) 2a of the frame 110. In some implementations, the guide 26 is attached adjacent to the tube 5 of the roller tube assembly 120.

In some implementations, the roller sheet guide 26 guides and maintains the roller blind sheet 130 firmly around the tube 5 as the roller blind sheet 130 is retracted and rolled up around the tube 5. In some implementations, the roller sheet guide 26 puts less wear on the roller blind sheet 130 than a roller sheet guide having a curved guide flange.

In some implementations, the guide 26 may be positioned in any suitable location on the frame first side 2a. For example, as shown in FIGS. 1b, 5, and 6, in some implementations, a first guide 26 is positioned approximately one-third of the way up the roller tube 5 from the frame bottom side 2b and a second guide 26 is positioned approximately two-thirds of the way up the roller tube 5 from the frame bottom side 2b.

In some implementations, the guide 26 can be attached to the frame first side 2a in various ways, such as by screws, nails, or adhesive.

In some implementations, the guide 26 forces the roller blind sheet 130 back toward the center axis of the roller tube 5 in the event that the roller blind sheet 130 becomes loose around the roller tube 5. In some implementations, this helps minimize the potential that the roller blind sheet 130 will fall below or to the bottom side of the bottom attachment flange 22c and interfere with other parts of the roller blind assembly 100.

Figure 10:
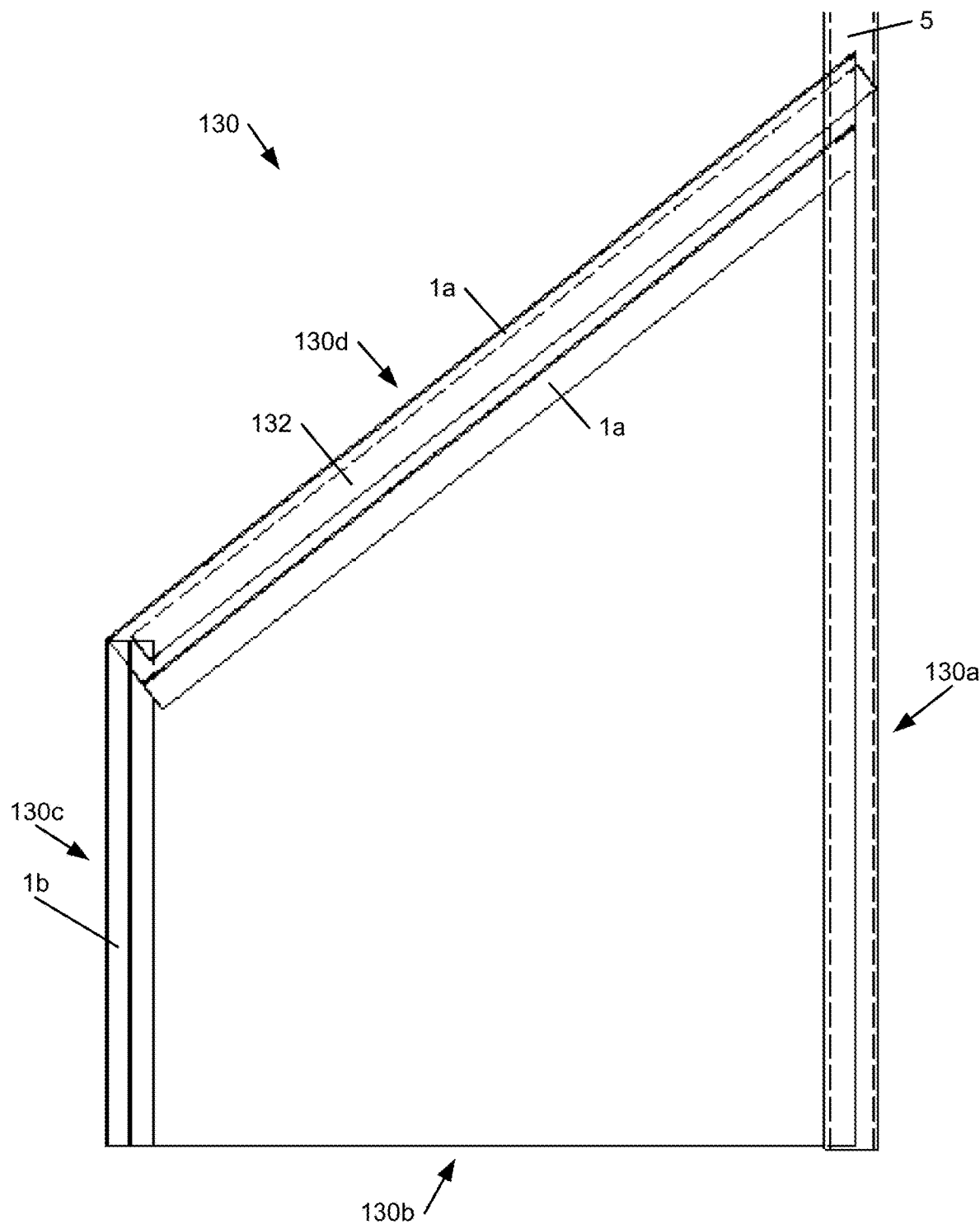
FIG. 10 illustrates a back side or exterior side view of the roller blind sheet of the roller blind assembly according to the present disclosure.

As shown in FIG. 10, in some implementations, the roller blind sheet 130 comprises a top edge 130d, a bottom edge 130b, a first (e.g., left) edge 130a, and a second (e.g., right) edge 130c.

In some implementations, the edges 130a, 130b, 130c, 130d define a shape of the roller blind sheet 130 that corresponds to the modified rectangular shape of the window described above. In some implementations, the shape of the roller blind sheet 130 corresponds to the shape of the window so that the roller blind sheet 130 can fully cover the opening of the window.

In some implementations, the first edge 130a is longer than the second edge 130c.

In some implementations, the first edge 130a is attached to the tube 5 of the roller tube assembly 120 so that the roller blind sheet 130 can be rolled up around the tube 5. In some implementations, the roller blind sheet 130 can be rolled up around the tube 5 to uncover the opening of the window.

In some implementations, the first edge 130a is attached to the tube 5 of the roller tube assembly 120 so that the roller blind sheet 130 can be unrolled and extended from the tube 5. In some implementations, the roller blind sheet 130 can be unrolled and extended from the tube 5 to fully cover the opening of the window.

In some implementations, the roller blind sheet 130, when fully extended from the roller tube 5, comprises the shape of the angled architectural opening in which the roller blind assembly 100 is installed. In some implementations, the fully extended roller blind sheet 130 comprises any other desired shape of coverage with respect to the angled architectural opening.

In some implementations, the top edge 130d of the roller blind sheet 130 is cut parallel to, but slightly below, the top edge of the angled architectural opening. In some implementations, this shaping of the roller blind sheet 130 allows a path for heat and heated gasses to escape from the exterior side 100b of the roller blind sheet 130 and out the top side 100c of the roller blind assembly 100.

In some implementations, the roller blind sheet 130 comprises additional material on the roller tube side, or retracted side, 130a of the roller blind sheet 130 to allow for the attachment of the roller blind sheet 130 to the roller tube 5.

In some implementations, the roller blind sheet 130 can be attached to the roller tube 5 at this additional material in various ways, such as by tape, glue, staples, screws, or nails.

In some implementations, this additional material of the roller blind sheet 130 that attaches to the roller tube 5 wraps at least partially around the roller tube 5 when the roller blind sheet 130 is fully extended from the roller tube 5.

In some implementations, the top edge 130d of the roller blind sheet 130 is stiff to horizontally support the roller blind sheet 130 when extended from the roller tube 5.

In some implementations, the top edge 130d of the roller blind sheet 130 is flexible to allow the roller blind sheet 130 to roll up around the tube 5 when retracted.

As shown in FIG. 10, in some implementations, the roller blind sheet 130 further comprises a narrow elongated sleeve 1a and a thin narrow elongated piece of material 132.

In some implementations, the narrow elongated sleeve 1a is adjacent to the top edge 130d of the roller blind sheet 130.

In some implementations, roller blind sheet 130 comprises additional material on the angled side, e.g. the top side 130d, of the roller blind sheet 130. In some implementations, this additional material is folded over and attached to the roller blind sheet 130 to form the sleeve 1a.

In some implementations, the folded over additional material can be attached to the roller blind sheet 130 to form the sleeve 1a in various ways, such as by sewing, glue, snaps, buttons, staples, or nuts and bolts.

In some implementations, the sleeve 1a extends at least partially along the angled side 130d of the roller blind sheet 130.

In some implementations, the sleeve 1a extends along all of the angled side 130d of the roller blind sheet 130, including along the additional material of the roller blind sheet 130 that attaches to the roller tube 5 as described above. Therefore, in some implementations, the sleeve 1a wraps at least partially around the roller tube 5 when the roller blind sheet 130 is fully extended.

In some implementations, the piece of material 132 is held within the sleeve 1a.

In some implementations, the piece of material 132 provides a stiff horizontal support to the roller blind sheet 130 when extended from the tube 5 of the roller tube assembly 120.

In some implementations, the piece of material 132 provides a flexibility that allows the roller blind sheet 130 to roll up around the tube 5 when the roller blind sheet 130 is retracted.

In some implementations, the sleeve 1a houses the piece of material 132.

In some implementations, the piece of material 132 supports the roller blind sheet 130 along the top side and/or the angled side of the roller blind sheet 130.

In some implementations, the piece of material 132 in the sleeve 1a provides stability to the top edge and/or the angled edge of the roller blind sheet 130.

In some implementations, the piece of material 132 in the sleeve 1a prevents sagging of the roller blind sheet 130 when extended from the roller tube 5.

In some implementations, the piece of material 132 in the sleeve 1a is sufficiently flexible and resilient to roll up and wrap around the roller tube 5 and to straighten out and extend from the roller tube 5.

In some implementations, the piece of material 132 in the sleeve 1a rolls up and wraps around the roller tube 5 along with the material of the roller blind sheet 130, including the additional material that is attached to the roller tube 5.

In some implementations, the piece of material 132 in the sleeve 1a wraps around the roller tube 5 as the roller blind sheet 130 is retracted and wrapped around the roller tube 5.

In some implementations, the piece of material 132 in the sleeve 1a straightens out and extends with the roller blind sheet 130 as the roller blind sheet 130 is unwrapped and extended from the roller tube 5.

In some implementations, the piece of material 132 may be a thin piece of metal material.

Considering the foregoing description, in some implementations, the piece of material 132 in the sleeve 1a behaves similar to a length of retractable tape measure material that is stored coiled inside a tape measure housing and that extends straight when withdrawn from the housing.

As shown in FIG. 10, in some implementations, the roller blind sheet 130 further comprises a narrow elongated sleeve 1b. In some implementations, the narrow elongated sleeve 1b is adjacent to the second edge 130c of the roller blind sheet 130.

In some implementations, a narrow elongated finger (also referred to herein as an extension rod) 7, which extends upward from the extension assembly 160 as described below, is inserted in the sleeve 1b to connect the extension assembly 160 to the roller blind sheet 130.

In some implementations, the roller blind sheet 130 comprises additional material on the extended side 130c of the roller blind sheet 130. In some implementations, this additional material is folded over and attached to the roller blind sheet 130 to form the second sleeve 1b.

In some implementations, the folded over additional material can be attached to the roller blind sheet 130 to form the sleeve 1b in various ways, such as by sewing, glue, snaps, buttons, staples, or nuts and bolts.

In some implementations, the sleeve 1b extends vertically along the extended side 130c of the roller blind sheet 130.

In some implementations, the sleeve 1b extends at least partially along the extended side 130c of the roller blind sheet 130.

Figure 17A:
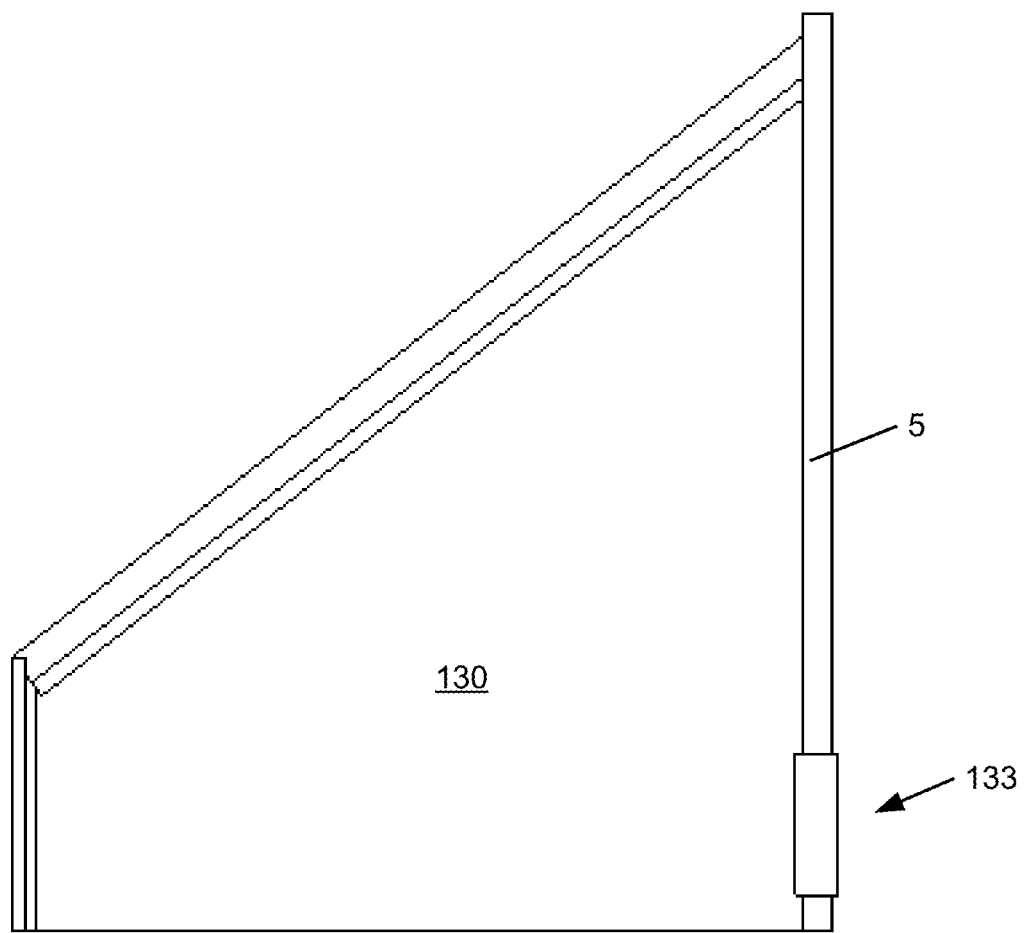
FIG. 17a illustrates an exterior side view of an extended shade of the roller blind assembly showing the shade clamp according to the present disclosure.
Figure 17B:
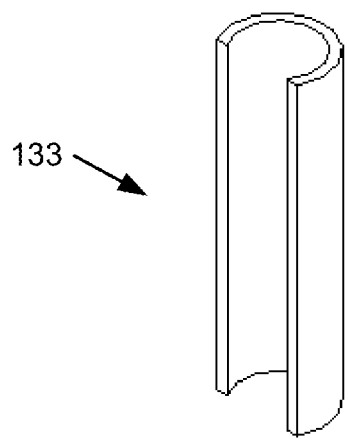
FIG. 17b illustrates a perspective view of the shade clamp of the roller blind assembly according to the present disclosure.

As shown in FIGS. 17a and 17b, in some implementations, a shade clamp 133 is installed over the roller tube 5 and any additional portion of the roller blind sheet 130 used to attach it to the roller tube 5. In some implementations, this additional portion of the roller blind sheet 130 is the portion of the roller blind sheet 130 that does not unwind from the roller tube 5 when the roller blind sheet 130 is fully extended.

In some implementations, the shade clamp 133 makes the bottom portion of the roller tube 5 thicker and thereby compensates for the added thickness of the top portion of the roller tube 5 resulting from the retracted roller blind sheet 130.

In some implementations, the top portion of the roller tube 5 has the added thickness resulting from the retracted roller blind sheet 130 due to the above-described elongated piece of material 132 included along the top portion of the roller blind sheet 130.

In some implementations, the thickness compensation of the roller tube 5 by the shade clamp 133 causes the roller blind sheet 130 to more uniformly retract onto the roller tube 5 and thereby reduces the resulting torque on the body/extension cart 6 (described below) during retraction of the roller blind sheet 130.

In some implementations, the tube 5 of the roller tube assembly 120 and the attached roller blind sheet 130 may be integrated or combined as a single component, such as or similar to a roller blind.

In some implementations, the roller blind sheet 130 may be any flexible material that can be used to cover an angled architectural opening and can wrap around a roller tube 5 when retracted.

In some implementations, the roller blind sheet 130 may be any material that can be used to completely, substantially, partially, or minimally block out light, a view, and/or radiant or heat energy from traversing through an angled architectural opening.

In some implementations, the roller blind sheet 130 may be a material that is referred to as blinds, shades, coverings, solar shades, or solar blinds.

Although parts of the sleeves 1a, 1b, flaps, seams, etc. are shown in FIG. 10 for description purposes, in some implementations, such parts of the sleeves 1a, 1b may be hidden or otherwise not visible, e.g. on one or both sides of the roller blind sheet 130.

Figure 12:
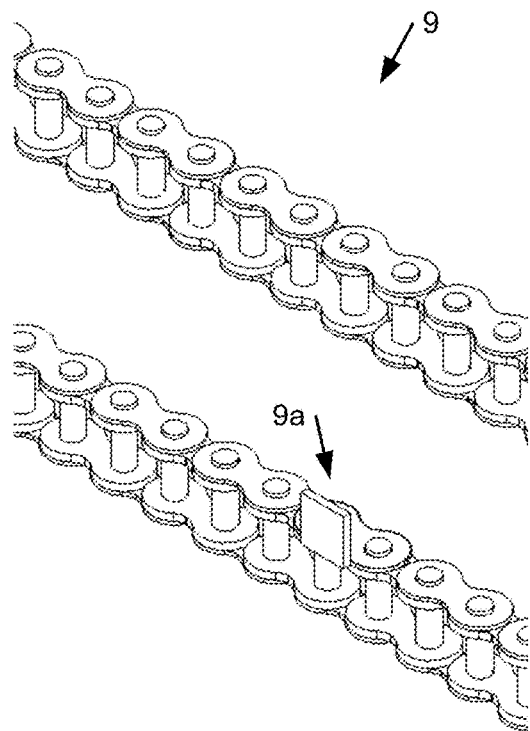
FIG. 12 illustrates a partial perspective view of the chain of the chain assembly of the roller blind assembly according to the present disclosure including the engaging extension.

As shown in FIGS. 1c and 12, in some implementations, the chain assembly 140 comprises a chain 9. In some implementations, the chain assembly 140 is attached to the frame 110.

In some implementations, the chain 9 comprises a roller type chain. In some implementations, the chain 9 comprises any other suitable type of chain.

In some implementations, the chain 9 extends in a horizontal loop between the first side 2a and the second side 2c of the frame 110 adjacent to the bottom side 2b of the frame 110. In some implementations, the horizontal loop in which the chain 9 extends is elliptical shaped.

In some implementations, the horizontal loop in which the chain 9 extends has any other suitable shape.

In some implementations, the chain 9 is moveable along the horizontal loop. In some implementations, the chain 9 travels around the track assembly 150.

In some implementations, the chain 9 comprises an engaging extension 9a.

As shown in FIG. 12, in some implementations, the engaging extension 9a comprises a substantially rectangular shaped plate. In some implementations, the engaging extension 9a may comprise a plate having any other suitable shape.

In some implementations, the engaging extension 9a may comprise any other suitable configuration, such as a finger of any suitable shape.

In some implementations, the engaging extension 9a is attached to the chain 9. In some implementations, the engaging extension 9a extends from the chain 9.

In some implementations, the chain 9 may comprise multiple (e.g., two or more) engaging extensions instead of the one extension 9a. In some implementations, such multiple engaging extensions are the same or similar to the extension 9a. In some implementations, such multiple engaging extensions can provide essentially the same or substantially similar function as the single extension 9a for the operation of the roller blind assembly 100 as described below.

As shown in FIGS. 7a-7b and 16a-16b, in some implementations, the chain assembly 140 may comprise two sprockets 28, 30. In some implementations, the sprockets 28, 30 allow the chain 9 to move in the travel path on the roller blind assembly 100.

In some implementations, the first sprocket 28 is a finished bore sprocket. In some implementations, the first sprocket 28 may be any other suitable type of sprocket.

In some implementations, the first sprocket 28 is positioned near the roller tube 5. As shown in FIG. 7a, in some implementations, the first sprocket 28 is positioned near the base of the shade bottom rod 23.

In some implementations, the first sprocket 28 rotates freely around the raised shaft (hollow center raised section) 29b of the retracted side sprocket bracket 29, in which the shade bottom rod 23 is positioned.

In some implementations, the movement of the chain 9 controls the rotation of the first sprocket 28. In some implementations, when the clutch 72, 72a is not extended to the sprocket cover 76, the rotation of the first sprocket 28 does not cause the bottom attachment 22 or the roller tube 5 to rotate.

Similarly, in some implementations, the rotation of the roller tube 5 or the bottom attachment 22 does not cause the first sprocket 28 to rotate when the clutch 72, 72a is not extended to the sprocket cover 76.

In some implementations, the sprocket bracket 29 prevents the first sprocket 28 from interfering with the frame bottom side 2b. Similarly, in some implementations, the sprocket bracket 29 prevents the chain 9 from interfering with the frame bottom side 2b as the chain 9 rotates around the first sprocket 28.

Figure 16A:
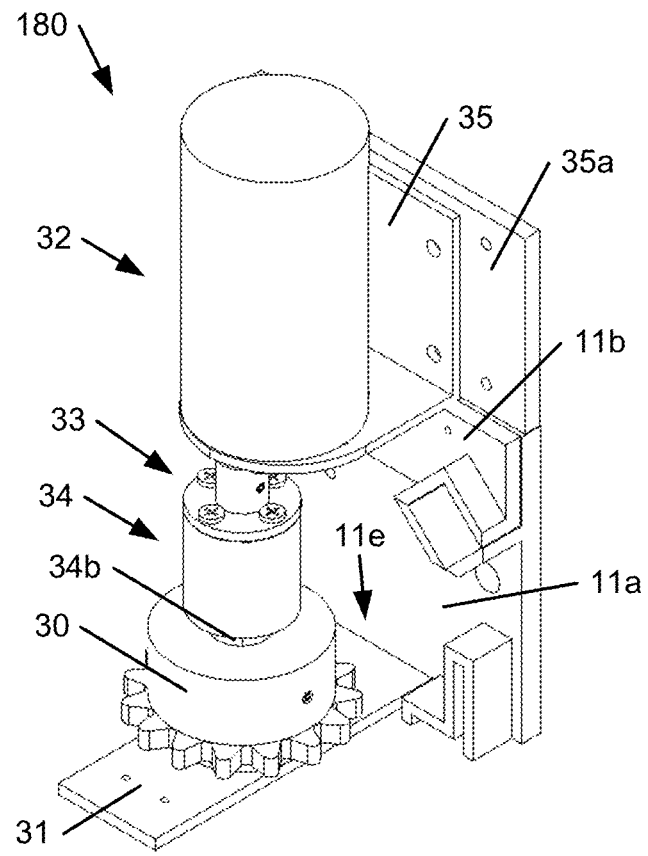
FIGS. 16a and 16b illustrate a perspective view and a corresponding exploded view respectively of the motor assembly of the roller blind assembly according to the present disclosure.
Figure 16C:
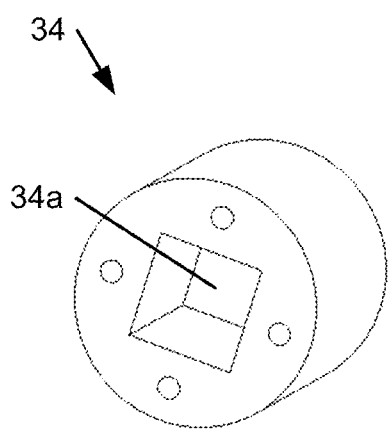
FIG. 16c illustrates a bottom perspective view of the motor connector/attachment of the roller blind assembly according to the present disclosure.
Figure 16B:
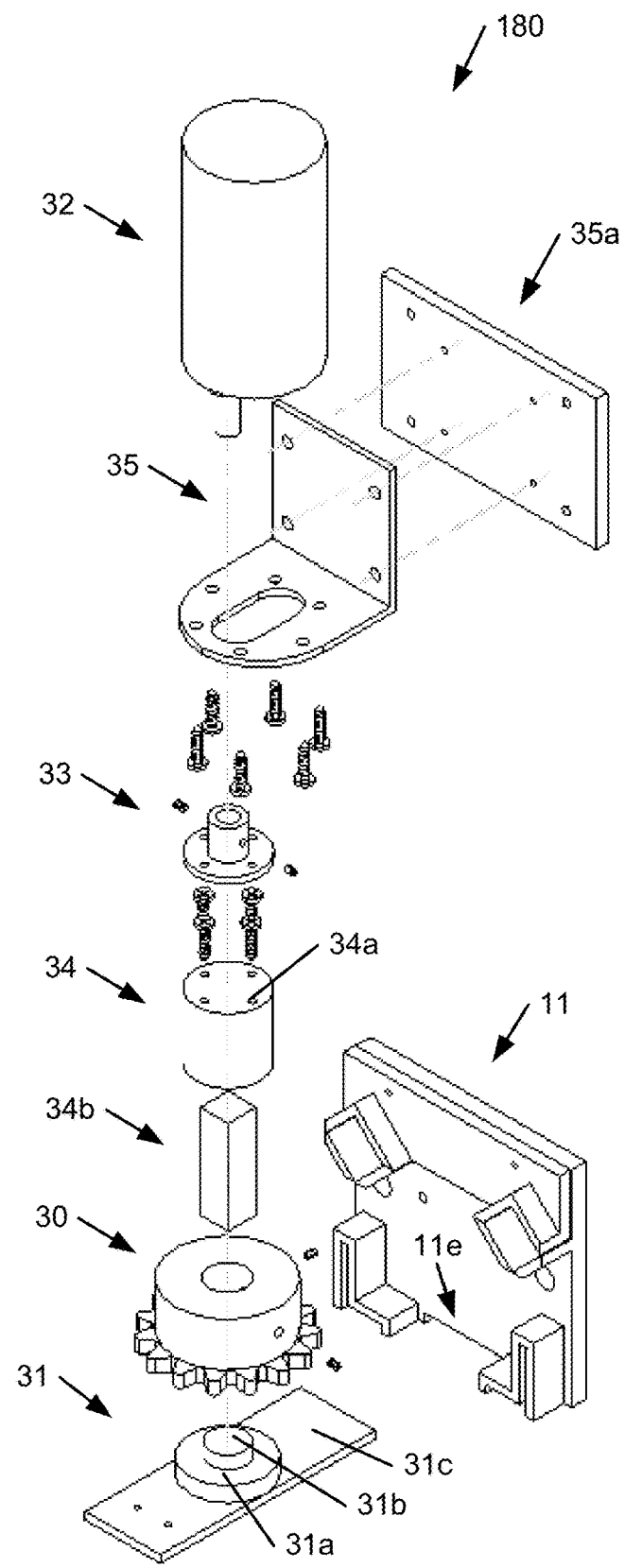

As shown in FIGS. 16a and 16b, in some implementations, the second sprocket 30 is positioned near the frame bottom side 2b on the extended side 2c of the roller blind assembly 100. In some implementations, the second sprocket 30 is positioned on top of a bracket 31.

As shown in FIG. 16b, in some implementations, the bracket 31 comprises a raised cylindrical section 31a. In some implementations, the second sprocket 30 is positioned on top of the cylindrical section 31a.

In some implementations, the cylindrical section 31a raises the sprocket 30 off of the bracket 31. In some implementations, the cylindrical section 31a prevents interference between the sprocket 30 and the frame bottom side 2b.

In some implementations, the bracket 31 comprises a second raised cylindrical section 31b. In some implementations, the second cylindrical section 31b is positioned on top of the first cylindrical section 31a.

In some implementations, the second cylindrical section 31b is large enough to prevent excess movement of the sprocket 30 away from the bracket 31.

In some implementations, the second cylindrical section 31b is small enough to allow the sprocket 30 to rotate freely on the bracket 31 with minimal friction between the bracket 31 and the sprocket 30.

In some implementations, the bracket 31 prevents the sprocket 30 from interfering with the frame bottom side 2b. Similarly, in some implementations, the sprocket 30 prevents the chain 9 from interfering with the frame bottom side 2b as the chain 9 rotates around the sprocket 30.

As shown in FIGS. 16a and 16b, in some implementations, the extended side sprocket bracket 31 comprise a flange 31c which fits in a cutout 11e on the bottom of the extended side track bracket 11, similar to the configuration of the retracted side sprocket bracket 29. In some implementations, the flange 31c is configured to position the sprocket 30 centered below the shaft of the motor 32.

In some implementations, the bracket 31 is connected to the frame bottom side 2b.

In some implementations, the bracket 31 can be attached to the frame bottom side 2b in various ways, such as by screws, nails, or adhesives.

In some implementations, inserting the flange 31c into the cutout 11e makes it easier to center the extended side sprocket bracket 31 on the frame bottom side 2b during manufacturing.

As shown in FIGS. 16a and 16b, in some implementations, the second sprocket 30 is coupled to the motor 32 by a motor connector 34. In some implementations, the sprocket 30 is attached to the motor connector 34 by a square key 34b.

In some implementations, the square key 34b is positioned in a cutout on the bottom of the motor connector 34 on one side and is positioned in the sprocket 30 on the other side. In some implementations, the square key 34b may be further attached to the sprocket 30 by set screws or any other suitable way.

In some implementations, the second sprocket 30 is a finished bore sprocket. In some implementations, the second sprocket 30 may be any other suitable type of sprocket.

Figure 11:
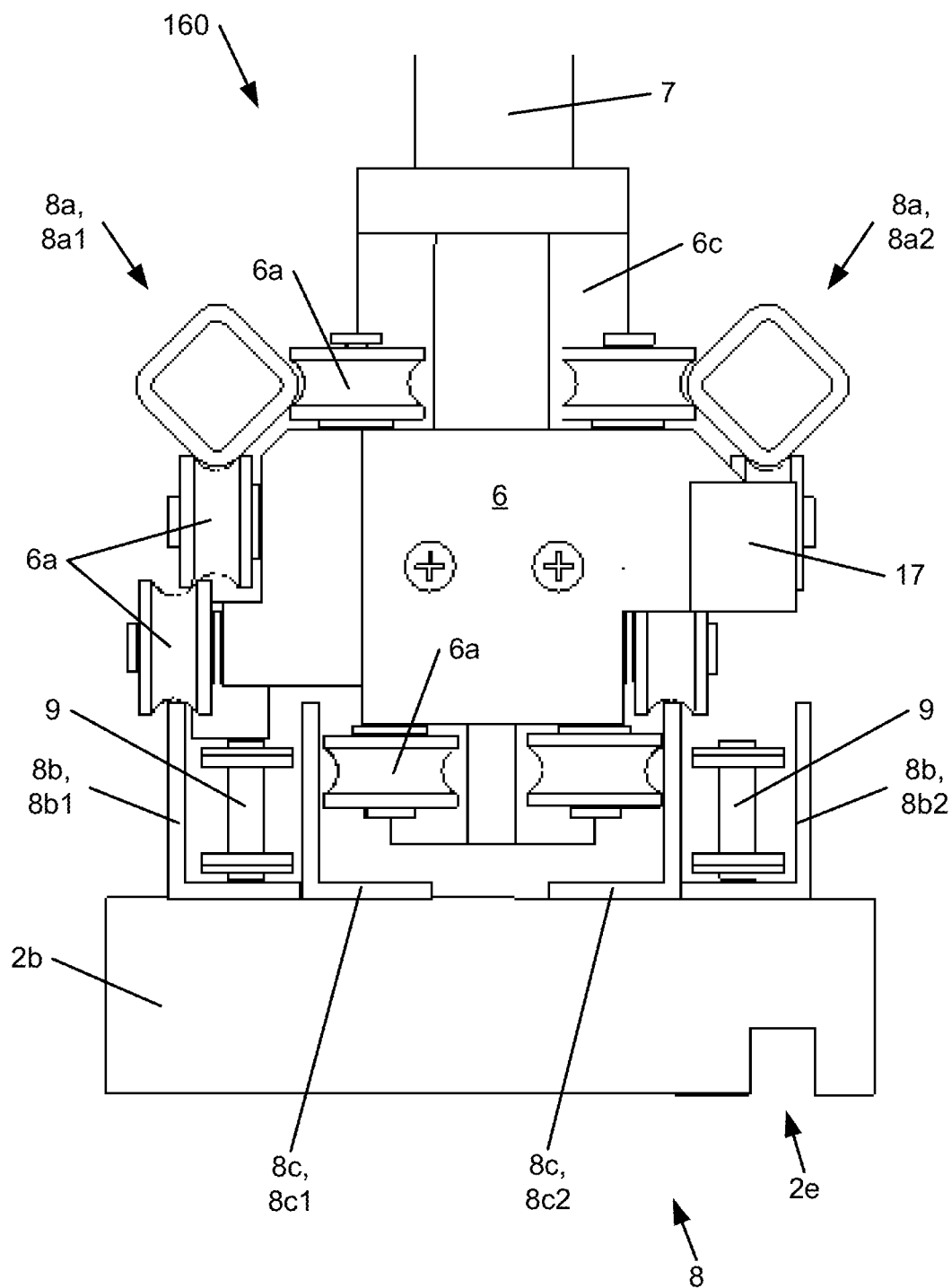
FIG. 11 illustrates a cross sectional view of the track assembly and other components of the roller blind assembly according to the present disclosure.

As shown in FIGS. 1c and 11, in some implementations, the track assembly 150 comprises an upper track 8a, a lower outside track 8b, and a lower inside track 8c.

As shown in FIG. 11, in some implementations, the upper track 8a comprises two square rods 8a1, 8a2. In some implementations, the lower outside track 8b comprises two angle extrusions 8b1, 8b2. In some implementations, the lower inside track 8c comprises two angle extrusions 8c1, 8c2.

Figure 13A:
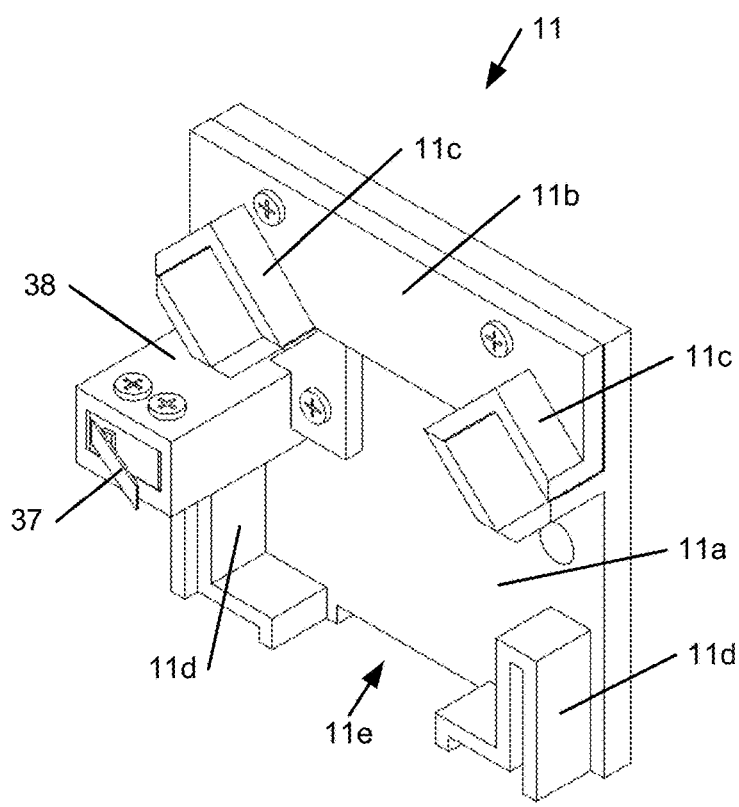
FIGS. 13a and 13b illustrate perspective views of the extended side track bracket of the track assembly of the roller blind assembly according to the present disclosure.
Figure 13B:
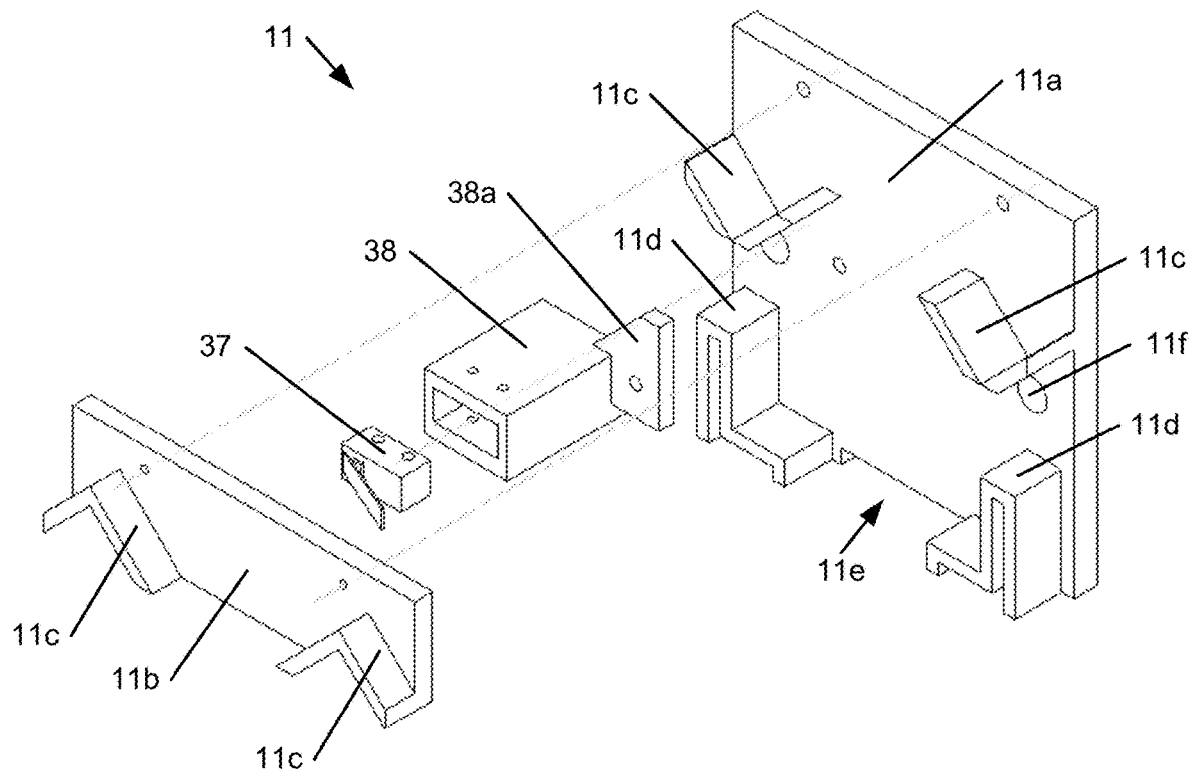
Figure 13C:
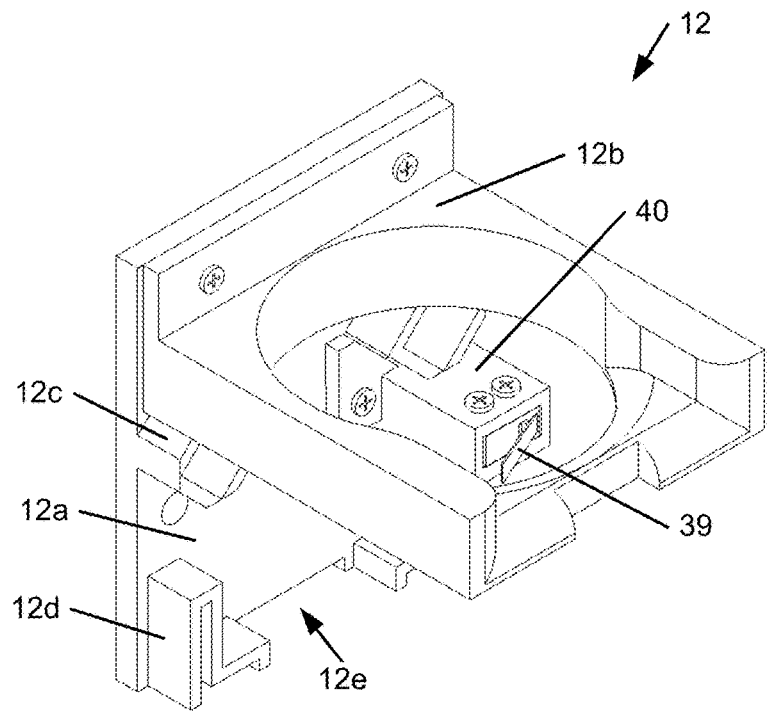
FIGS. 13c and 13d illustrate perspective views of the retracted side track assembly bracket of the track assembly of the roller blind assembly according to the present disclosure.
Figure 13D:
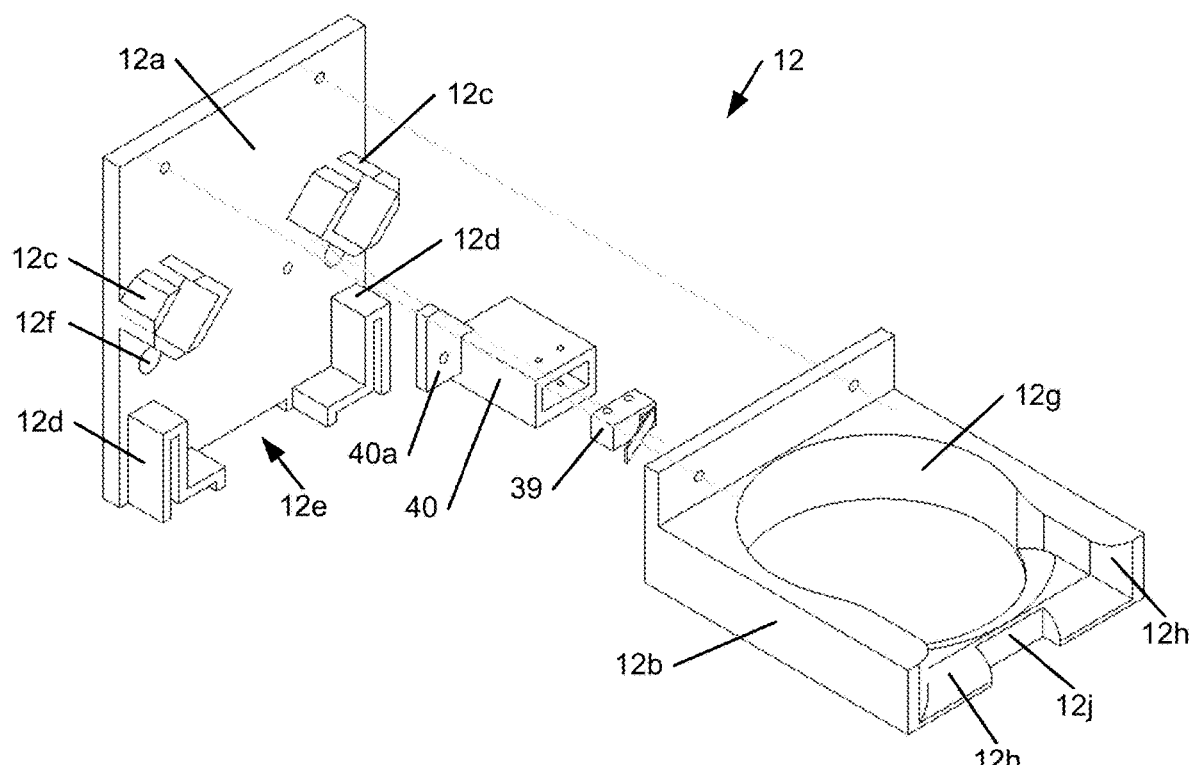

In some implementations, the upper track 8a is held in place on the retracted side 2a by flanges 12c that are connected to the retracted side track bracket 12, 12a shown in FIGS. 13c and 13d. In some implementations, the upper track 8a is held in place on the extended side 2c by flanges 11c on the extended side track bracket 11, 11a shown in FIGS. 13a and 13b.

In some implementations, the tracks 8a1, 8a2 of the upper track 8a are held in place on the extended side 2c by installing an extended side track bracket cap 11b (shown in FIGS. 13a and 13b) which has flanges 11c that hold the top edges of the tracks 8a1, 8a2.

In some implementations, the flanges 11c on the extended side track bracket 11a support just the bottom portion of tracks 8a1, 8a2, which makes it easier to install the tracks 8a1, 8a2 during manufacturing.

In some implementations, the lower outside track 8b is positioned on the frame bottom side 2b and extends from the retracted side track bracket 12, 12a to the extended side track bracket 11, 11a, shown in FIGS. 13a-13d. In some implementations, the lower outside track 8b is held in place on the retracted side 2a by flanges 12d on the retracted side track bracket 12, 12a. In some implementations, the lower outside track 8b is held in place on the extended side 2c by flanges 11d on the extended side track bracket 11, 11a.

In some implementations, the lower inside track 8c is positioned on (e.g., screwed to) the frame bottom side 2b just inside the bottom flanges of the lower outside track 8b1, 8b2. In some implementations, the lower inside track pieces 8c1, 8c2 extend from the inside edge of the retracted sprocket bracket 29 to the inside edge of the extended sprocket bracket 31.

As shown in FIGS. 13a-13d, in some implementations, limit switch brackets 38, 40 are attached to the extended side and retracted side track brackets 11, 12 respectively. In some implementations, the limit switch brackets 38, 40 comprise flanges 38a, 40a that help align the limit switch brackets 38, 40 in the proper location under the flanges 11c, 12c respectively. In some implementations, the flanges 38a, 40a also help align the screw holes therein to the screw holes in the extended side and retracted side track brackets 11, 12 respectively.

As shown in FIGS. 13a-13d, in some implementations, limit switches 37, 39 slide in and attach to the limit switch brackets 38, 40 respectively. In some implementations, the limit switches 37, 39 attach to the limit switch brackets 38, 40 by screws inserted through holes in the brackets 38, 40 that align with screw holes in the limit switches 37, 39. In some implementations, the limit switches 37, 39 attach to the limit switch brackets 38, 40 in any other suitable way.

As shown in FIGS. 13b and 13d, in some implementations, the track brackets 11, 12 also comprise wire cutouts 11f, 12f. In some implementations, the wire cutouts 11f, 12f allow the wires for the limit switches 37, 39 to pass through the brackets 11, 12, and through holes in the frame sides 2a, 2c into the wire channels 2e on the outside of the frame sides 2a, 2c, such as shown in FIGS. 4 and 5.

As shown in FIGS. 13c and 13d, in some implementations, the retracted side track bracket 12 also comprises a cap 12b positioned above the track support flanges 12c. In some implementations, the cap 12b comprises a circular inside opening 12g. In some implementations, the diameter of the opening 12g is slightly larger than the diameter of the lower flange 22c on the lower attachment 22.

As shown in FIGS. 7a, 7b, 13c, and 13d, in some implementations, as the lower attachment 22 positions on the shade bottom rod 23, the flange 22c positions inside the opening 12g on the retracted side track bracket cap 12b. In some implementations, this helps guide the roller blind sheet 130. In some implementations, this also helps keep the roller blind sheet 130 from falling below the flange 22c on the lower attachment 22 and contacting the sprocket 28 and/or chain 9.

As shown in FIG. 13d, in some implementations, the retracted side track cap 12b also comprises smooth edges 12h which prevent wear on the roller blind sheet 130 as it is extended and retracted from the roller tube 5.

In some implementations, the retracted side track cap 12b also comprises a cutout 12j. In some implementations, the cutout 12j is configured to be slightly larger than the extension 6c on cart 6, which allows the cart 6 to travel closer to the retracted side 2a of the roller blind assembly 100.

In some implementations, attaching the extended side bracket 11 to the frame extended side 2c also allows for maximum travel of the extension cart/body 6 toward the extended side 2c.

In some implementations, the extended side bracket 11 can be attached to the frame extended side 2c in various ways such as by screws or adhesive.

In some implementations, the track assembly 150 can be made from various different designs and materials.

In some implementations, the retracted side bracket 12 can be attached to the frame retracted side 2a in various ways such as by screws or adhesive.

As shown in FIG. 1c, in some implementations, the extension assembly 160 is moveably connected to the track 8. In some implementations, the extension assembly 160 can move along the track 8 between the first side 2a and the second side 2c of the frame 110.

In some implementations, the extension assembly 160 is engageably coupleable to the chain 9 by the body/extension cart 6 of the extension assembly 160. In some implementations, a movement of the engaging extension 9a toward the extension assembly 160 by a movement of the chain 9 causes the engaging extension 9a to engage the body 6 of the extension assembly 160. In some implementations, the movement of the engaging extension 9a causes the chain 9 to couple to the extension assembly 160 to move the extension assembly 160 along the track 8.

As shown in FIG. 1a, in some implementations, the extension assembly 160 is connected to the roller blind sheet 130 by the rod 6c, 7 of the extension assembly 160 adjacent to the second edge 130c of the roller blind sheet 130. In some implementations, a movement of the extension assembly 160 along the track 8 by the chain 9 causes an unrolling of the roller blind sheet 130 from the tube 5. In some implementations, the movement of the extension assembly 160 causes an extending of the roller blind sheet 130 horizontally across the frame 110.

As shown in FIG. 1c, in some implementations, the extension assembly 160 further comprises a narrow elongated finger (also referred to herein as an extension rod) 7, described more below. In some implementations, the finger 7 extends upward from the extension assembly 160.

In some implementations, the finger 7 comprises a c-shaped or u-shaped channel. In some implementations, the finger 7 may comprise any other suitably shaped elongated projection.

Figure 2:
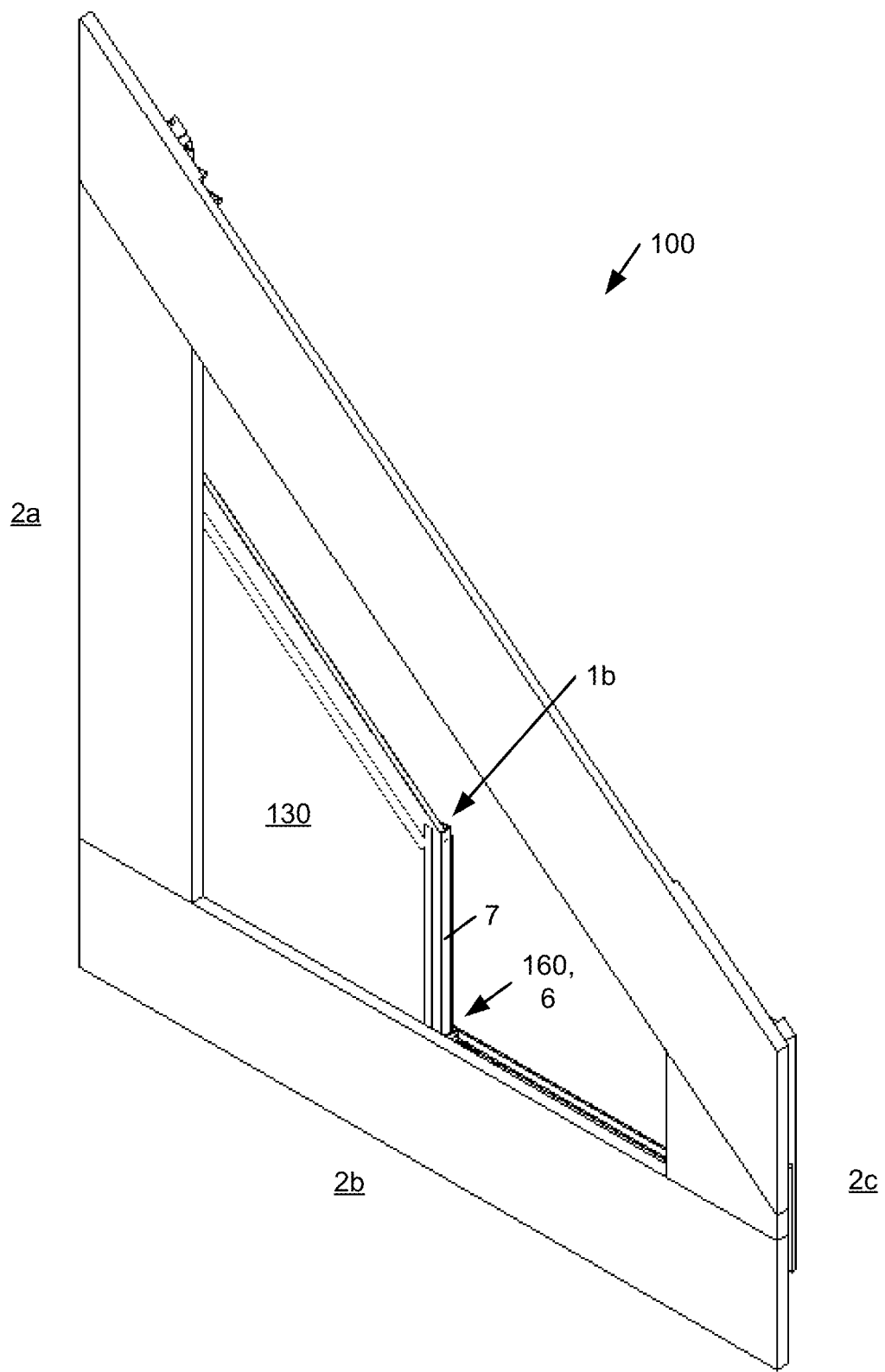
FIG. 2 illustrates another front side or interior side perspective view of the roller blind assembly according to the present disclosure with the roller blind sheet partially extended or retracted.

As shown in FIG. 2, in some implementations, the finger 7 is inserted in the sleeve 1b of the roller blind sheet 130, described above, to connect the extension assembly 160 to the roller blind sheet 130.

Figure 14A:
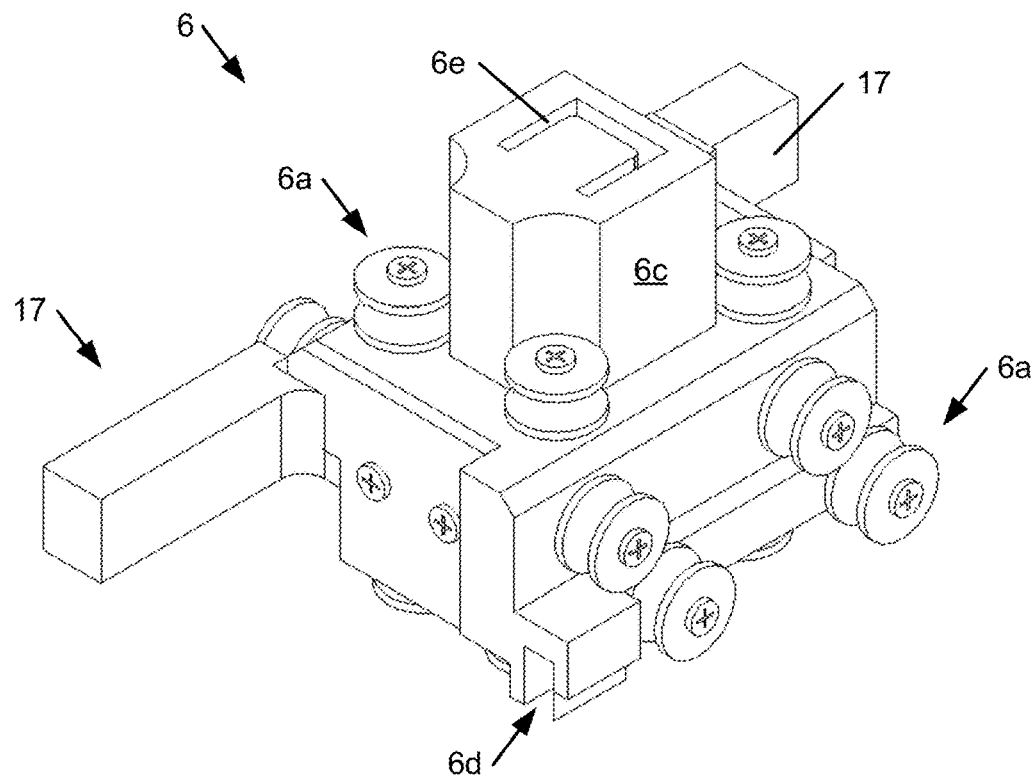
FIGS. 14a and 14b illustrate side and bottom perspective views respectively of parts of the extension assembly of the roller blind assembly according to the present disclosure.
Figure 14B:
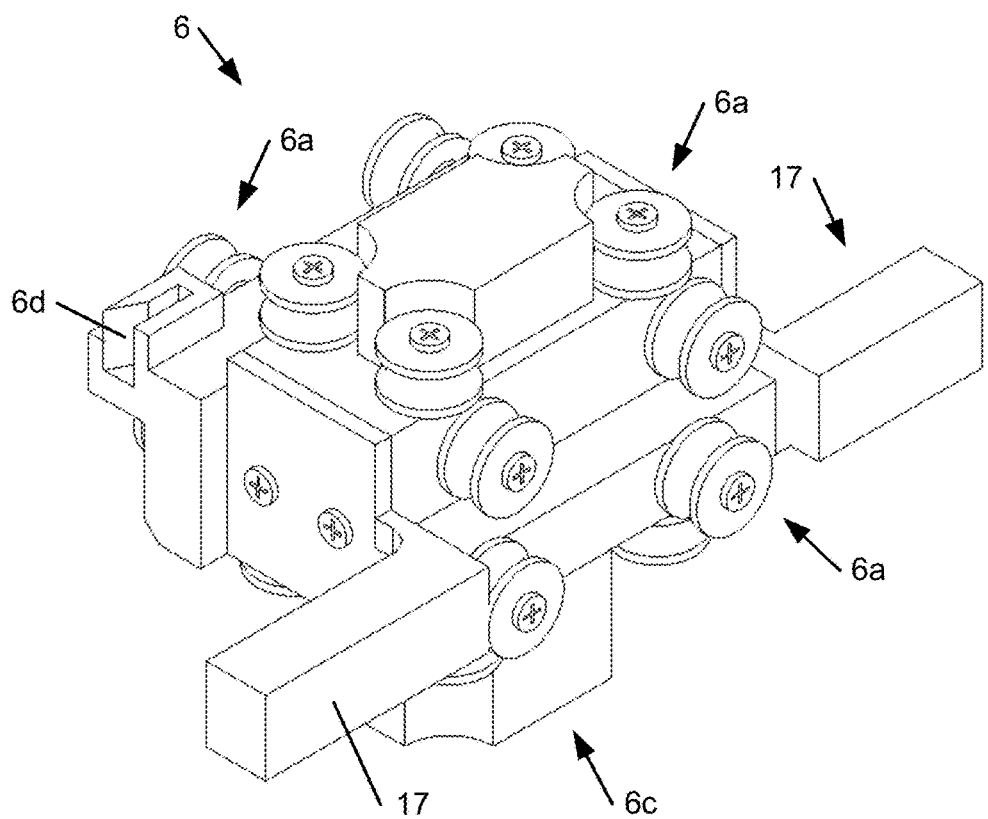

As shown in FIGS. 11, 14a, and 14b, in some implementations, the extension assembly 160 comprises a generally rectangular prism shaped body/extension cart 6 having a rod 6c, 7 extending therefrom, as described herein.

As shown in FIGS. 14a and 14b, in some implementations, the cart 6 comprises pulleys 6a. In some implementations, the pulleys 6a include bearings. In some implementations, the pulleys 6a comprise concave edges which help the pulleys 6a engage and stay aligned with the tracks 8a, 8b, 8c.

As shown in FIG. 11, in some implementations, the pulleys 6a at the top of the cart 6 ride along the inner edges 8a1, 8a2 of the upper track 8a. In some implementations, the pulleys 6a at the bottom of the cart 6 ride between the raised flanges 8c1, 8c2 of the lower inside track 8c.

In some implementations, the lower pulleys 6a at the sides of the cart 6 ride along the raised edges 8b1, 8b2 of the lower outside track 8b and the raised edges 8c1, 8c2 of the lower inside track 8c. In some implementations, the upper pulleys 6a at the sides of the cart 6 ride along the lower edges 8a1, 8a2 of the upper track 8a.

In some implementations, the chain 9 rides between the raised edges 8b1, 8b2, 8c1, 8c2 of the lower tracks 8b, 8c.

As shown in FIG. 11, in some implementations, the extension assembly 160 comprises a body/extension cart 6 and a finger/extension rod 7.

In some implementations, the extension rod 7 is attached to and extends from the extension cart 6. In some implementations, the extension rod 7 can be attached or otherwise connected to the extension cart 6 in various ways, such as by screw(s), set screw(s), an adhesive, or a friction fit.

As shown in FIGS. 11 and 14a, in some implementations, the c-channel extension rod 7 positions and attaches in an opening 6e at the top of the cart 6.

As shown in FIG. 2, in some implementations, the sleeve 1b positions over the extension rod 7.

In some implementations, the extension rod 7 on the extension cart 6 provides support to the extended side 130c of the roller blind sheet 130.

In some implementations, the extension rod 7 on the extension cart 6 prevents the extended side 130c of the roller blind sheet 130 from falling from the extension rod 7.

In some implementations, the bottom of the sleeve 1b sits on top of the extension cart 6, which prevents the roller blind sheet 130 from falling from the extension rod 7.

In some implementations, the positioning of the sleeve 1b onto the extension rod 7 adjacent to the extension cart 6 couples or connects the roller blind sheet 130 to the extension cart 6.

In some implementations, as the extension cart 6 is pushed or otherwise moves along the track 8, the extension rod 7 on the extension cart 6 pulls and extends the roller blind sheet 130 over an angled architectural opening to which the roller blind assembly 100 is attached.

Similarly, in some implementations, as the roller tube 5 is rotated or otherwise turns to retract the roller blind sheet 130, the roller blind sheet 130 is pulled or otherwise retracted from over the angled architectural opening. In some implementations, as the roller blind sheet 130 is retracted, the roller blind sheet 130 pulls the extension rod 7 by the connection to the sleeve 1b, which thereby pulls the extension cart 6 toward the roller tube 5.

In some implementations, the shape of the extension cart 6 is designed to hold the extension rod 7 in a vertical position. As shown in FIGS. 11 and 14a-14b, in some implementations, the extension cart 6 comprises a hollow extension 6c on the top side of the extension cart 6. In some implementations, the hollow portion of the extension 6c and/or the cutout/opening 6e is configured to snuggly hold the extension rod 7 to thereby couple the extension rod 7 and the extension cart 6 together.

In some implementations, movement of the extension cart 6 therefore causes corresponding movement of the extension rod 7. In some implementations, movement of the extension rod 7 therefore causes corresponding movement of the extension cart 6.

As introduced above, in some implementations, the roller blind assembly 100 may be rotated bottom side 2b up for use in an angled architectural opening with an angled bottom side instead of an angled top side. In some implementations, for such rotated assembly 100, additional ways of attachment can be used to prevent gravity from detaching the extension rod 7 from the extension cart 6 and from pulling the roller blind sleeve 1b off of the extension rod 7. In some implementations, such additional ways of attachment may include various ways, such as by glue, screw(s) or set screw(s).

As shown in FIG. 14b, in some implementations, the extension cart 6 comprises a cutout 6d on the bottom of the extension cart 6. In some implementations, the cutout 6d is wider at the opening and narrows to slightly wider than the engaging extension 9a at the other end of the cutout 6d.

In some implementations, the cutout 6d guides the engaging extension 9a to engage the extension cart 6 when the chain 9 is moved in the direction to push the extension cart 6 toward the extended side 2c of the roller blind assembly 100. In some implementations, the engaging extension 9a is then housed into the extension cart 6 when the engaging extension 9a reaches the closed end of the cutout 6d.

In some implementations, once the engaging extension 9a is housed into the extension cart 6 by the cutout 6d, further movement of the chain 9 to extend the roller blind sheet 130 pushes the extension cart 6 toward the extended side 2c of the roller blind assembly 100. In some implementations, the roller blind sheet 130 is thereby pulled toward the extended side 2c of the roller blind assembly 100 by the coupling of the roller blind sheet 130 to the extension cart 6 through the connection of the sleeve 1b and the extension rod 7.

In some implementations, the engaging extension 9a slides out of the extension cart 6 when the chain 9 is moved in the other direction toward the retracted side 2a of the roller blind assembly 100. In some implementations, the engaging extension 9a can then travel away from the extension cart 6 without further affecting the position of the extension cart 6.

As shown in FIGS. 14a and 14b, in some implementations, the limit switch extensions 17 of the extension cart 6 attach to the applicable side of the cart by a flange of the extensions 17. In some implementations, the limit switch extensions 17 attach to the cart 6 at the flange by screws or in any other suitable way.

In some implementations, the limit switch extensions 17 are configured to contact or otherwise interact with the limit switches 37, 39 at the appropriate cart 6 location(s).

In some implementations, the length of the extension 17 on each end is based respectively on the location of the limit switches 37, 39 relative to the extension cart 6 when the roller blind sheet 130 is in the fully extended or fully retracted position.

In some implementations, the extension 17 can be connected to the extension cart 6 in various ways, such as by nuts and bolts, screws, or adhesive.

In some implementations, the extension 17 and the extension cart 6 may be integrated as a single part of the extension assembly 160.

As shown in FIGS. 1c, 7c, 15a, and 15b, in some implementations, the roller blind assembly 100 uses an actuator and clutch assembly 170 to retract the roller blind sheet 130.

Figure 15A:
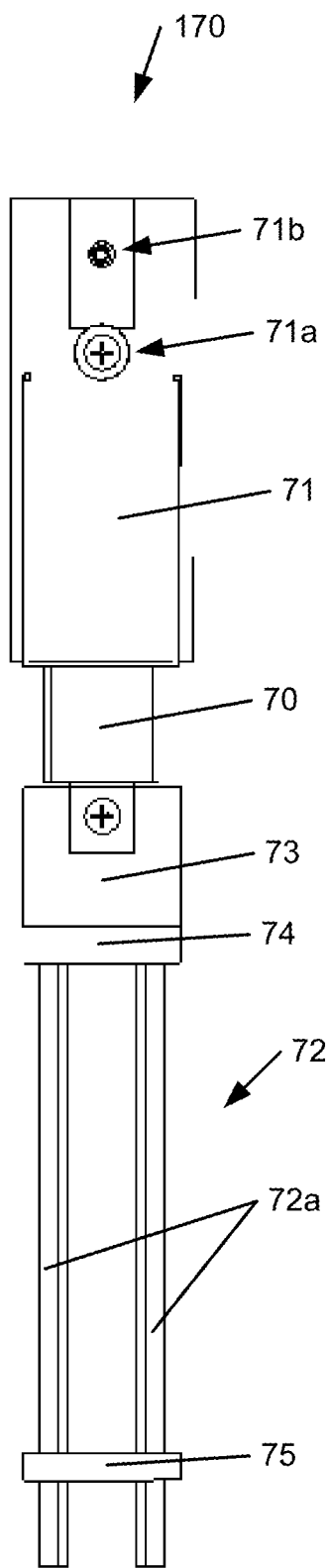
FIGS. 15a and 15b illustrate a side view and a corresponding exploded perspective view respectively of the actuator and clutch assemblies of the roller blind assembly according to the present disclosure.
Figure 15B:
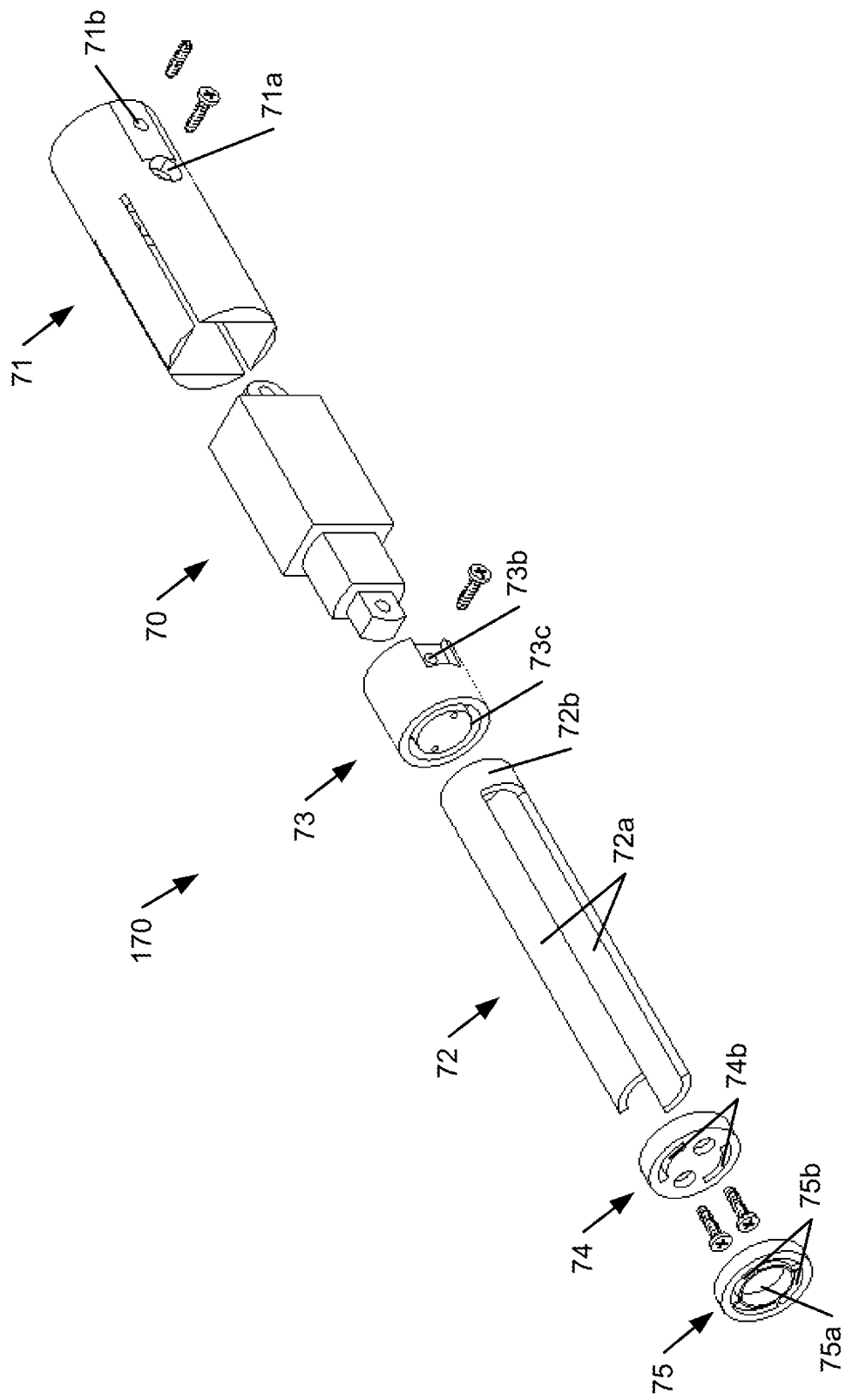

As shown in FIG. 7c, in some implementations, the actuator 70 is located within the bottom portion of roller tube 5. As shown in FIGS. 15a and 15b, in some implementations, the actuator 70 is inserted into an actuator bracket 71 that holds the actuator 70 firmly within the roller tube 5.

In some implementations, the outside of the actuator bracket 71 is configured to fit inside (e.g., match the inside shape of) the roller tube 5. In some implementations, the inside of the actuator bracket 71 is configured to fit (e.g., match the outside shape of) the actuator 70.

Figure 15C:
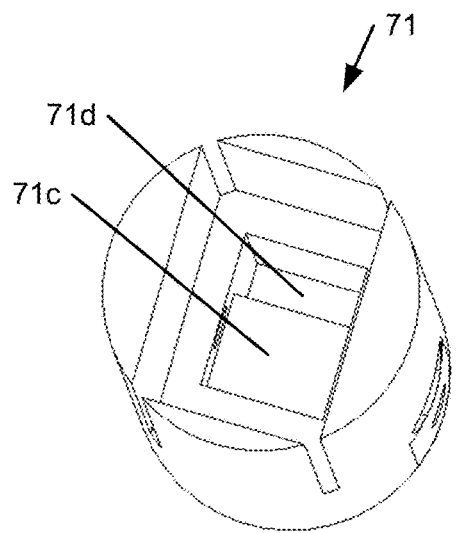
FIG. 15c illustrates a bottom perspective view of the actuator housing of the roller blind assembly according to the present disclosure.
Figure 15D:
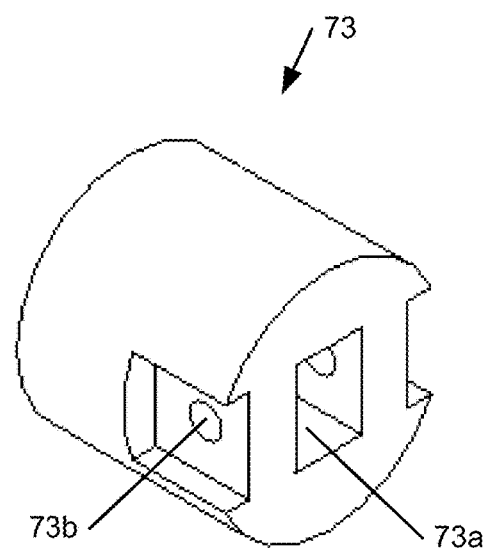
FIG. 15d illustrates a top perspective view of the clutch connector of the roller blind assembly according to the present disclosure.

As shown in FIG. 15c, in some implementations, the actuator bracket 71 comprises a cutout 71c that houses a mounting screw attachment of the actuator 70. As shown in FIGS. 15a and 15b, in some implementations, the actuator bracket 71 also comprises a screw hole 71a that extends through the cutout 71c.

In some implementations, the actuator 70 is firmly attached within the actuator bracket 71 by a fastener (such as a screw or dowel) that extends through the screw hole 71a and the mounting screw attachment.

As shown in FIG. 15c, in some implementations, the actuator bracket 71 comprises another cutout 71d that allows wires from the actuator 70 to pass through the top of the actuator bracket 71. As shown in FIGS. 15a and 15b, in some implementations, the actuator bracket 71 also comprises another hole 71b.

In some implementations, the actuator and clutch assembly 170 is firmly attached within the roller tube 5 by a fastener (such as a setscrew or dowel) that inserts through the roller tube 5 and the screw hole 71b.

As shown in FIGS. 15a and 15b, in some implementations, the actuator 70 comprises a mounting hole attachment at the end of an extending part of the actuator 70. In some implementations, the mounting hole attachment inserts into a cutout 73a of the clutch attachment 73.

In some implementations, the clutch attachment 73 is firmly attached to the extending end of the actuator 70 by a fastener (such as a screw or dowel) that inserts through a hole 73b in the clutch attachment 73 and engages the cutout 73a.

As shown in FIGS. 15a and 15b, in some implementations, the clutch 72 extends in a pipe-shape with slots that form clutch teeth 72a. In some implementations, the slots in the pipe-shaped clutch 72 do not fully extend to the top end 72b of the clutch 72 such that the top end 72b is able to hold the clutch teeth 72a in the clutch attachment 73.

In some implementations, the top end 72b of the clutch 72 is closed and is positioned in an inset cutout 73c on the bottom side of the clutch attachment 73. In some implementations, the clutch 72 is held in position on the clutch attachment 73 by a clutch attachment cap 74.

Figure 15E:
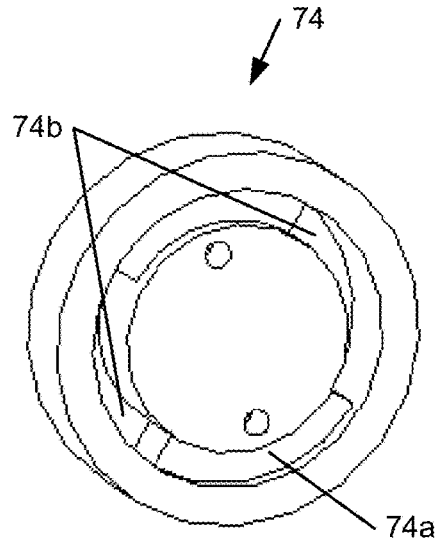
FIG. 15e illustrates a top perspective view of the clutch connector cap of the roller blind assembly according to the present disclosure.

As shown in FIGS. 15*b* and 15*e*, in some implementations, the clutch attachment cap 74 comprises a cutout 74*a* that is shaped like the top end 72*b* of the clutch 72. In some implementations, the cutout 74*a* is similar to the cutout 73*c* of the clutch attachment 73.

In some implementations, the clutch attachment cap 74 also comprises cutouts 74*b* that are shaped like the cross section of the clutch teeth 72*a*. In some implementations, the clutch attachment cap 74 positions over the bottom of the clutch teeth 72 through the cutouts 74*b*.

In some implementations, the clutch attachment cap 74 is positioned at the top end 72*b* of the clutch 72. In some implementations, the clutch attachment cap 74 is attached (e.g., by a screw) to the clutch attachment 73 with the clutch top end 72*b* seated firmly and pinched between the clutch attachment 73 and the clutch attachment cap 74.

In this way, in some implementations, extending or retracting the actuator also extends or retracts the clutch 72.

As shown in FIG. 7*a*, in some implementations, the assembly 170 is positioned inside the bottom of the roller tube 5 such that the clutch teeth 72*a* extend beyond the bottom edge of the roller tube 5. In some implementations, the bottom attachment 22 is also positioned in the bottom of the roller tube 5.

In this way, in some implementations, the clutch teeth 72*a* can extend beyond the bottom flange 22*c* of the bottom attachment 22 through the cutouts 22*d*.

As shown in FIGS. 7*a*, 15*a*, and 15*b*, in some implementations, the clutch teeth 72*a* position around the shade roll bottom rod 23. In some implementations, a clutch teeth spacer 75 is positioned over the clutch teeth 72*a* that helps keep the clutch teeth 72*a* aligned.

As shown in FIG. 15*b*, in some implementations, the spacer 75 comprises a center hole 75*a* that is larger than the diameter of the shade roll bottom rod 23. In some implementations, the spacer 75 can thereby move vertically with the clutch teeth 72*a* without interfering with the shade roll bottom rod 23.

In some implementations, the spacer 75 also comprises cutouts 75*b* that are shaped like the cross section of the clutch teeth 72*a*. In some implementations, the spacer 75 is positioned and fits snugly on the clutch teeth 72*a* with the shade roll bottom rod 23 passing through the center of the spacer 75 and into the opening 22*a* of the bottom attachment 22.

In some implementations, the spacer 75 is positioned on the clutch teeth 72*a* in a vertical position such that the spacer 75 does not interfere with the bottom attachment 22 when the actuator 70 is retracted and does not interfere with the sprocket cover 76 when the actuator 70 is extended.

As shown in FIGS. 7*a* and 7*b*, in some implementations, the sprocket cover 76 is positioned over the retracted side sprocket 28. In some implementations, the bottom side of the sprocket cover 76 is configured to fit snugly over and cover the top side of the sprocket 28.

In some implementations, the sprocket cover 76 comprises a hole 76*b* that has a diameter that is larger than the diameter of the raised hollow section 29*b* of the retracted side socket bracket 29. In some implementations, the hole 76*b* allows the sprocket cover 76 to fit over and rotate around the raised hollow section 29*b*.

In some implementations, the sprocket cover 76 also comprises holes 76*c* that align with the set screws of sprocket 28 with the sprocket cover 76 positioned over the sprocket 28. In some implementations, setscrews are slightly withdrawn from the sprocket 28 into the sprocket cover holes 76*c* to connect the sprocket cover 76 to the sprocket 28.

In some implementations, the sprocket cover 76 also comprises cutouts 76*a* that are configured to receive the ends of the clutch teeth 72*a*.

Figure 8C:
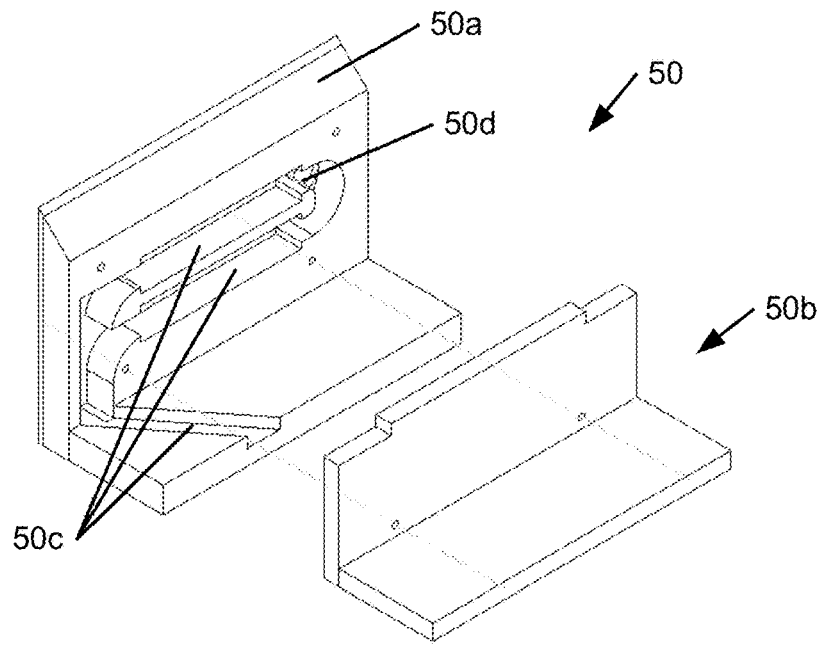

In some implementations, the wiring (wires) for the actuator 70 routes from the actuator 70 through the cutout 71*d* in the actuator bracket 71 (shown in FIG. 15*c*) and up the length of roller tube 5. As shown in FIG. 8*c*, in some implementations, an actuator wire housing bracket 50 helps manage the routing of the actuator wires as they exit the roller tube 5 and run to the outside of the frame retracted side 2*a*.

As shown in FIGS. 5 and 8*a*, in some implementations, the actuator wire housing bracket 50 is attached to the top portion of the frame retracted side 2*a* above the roller tube top bracket 24. In some implementations, the actuator wire housing bracket 50 is attached to the frame 2*a* at the bracket base 50*a*.

As shown in FIG. 8*c*, in some implementations, the base 50*a* comprises wiring channels 50*c*. In some implementations, the actuator 70 wiring is routed along the channels 50*c* from out of the top of the roller tube 5.

In some implementations, the routing of the actuator 70 wires through the wire housing bracket 50 helps prevent the roller tube 5 from damaging the actuator 70 wiring when the roller tube 5 rotates for extension and retraction of the roller blind sheet 130.

In some implementations, the wire channels 50*c* also provide a safe location for wire connections so the actuator 70 wiring can be quickly disconnected without having to remove the actuator 70 wires all the way back to the motor control circuitry housing 190 (described below).

As shown in FIG. 8*c*, in some implementations, the wire housing bracket 50 also comprises a wire pass-through 50*d*. In some implementations, the wire pass-through 50*d* provides a path for the actuator 70 wires to travel from the inside of the frame 110, 2*a* to the outside of the frame 110, 2*a* and into the wire channel 2*e*.

As shown in FIG. 8*c*, in some implementations, the wiring bracket 50 also comprises a cap 50*b*. In some implementations, the cap 50*b* attaches to the bracket base 50*a* and helps to maintain the actuator 70 wires in the wire channels 50*c*.

As shown in FIGS. 6 and 16*a*-16*b*, in some implementations, the motor assembly 180 comprises a motor 32. In some implementations, the motor assembly 180 is attached to the frame 110.

In some implementations, the motor 32 is coupled to the chain 9, such as described further below, so that the motor 32 can cause the chain 9 to move along the horizontal loop.

In some implementations, the motor 32 is operable to move the chain 9 in a first direction that moves the engaging extension 9*a* toward the extension assembly 160. In some implementations, the motor 32 can move the engaging extension 9*a* to engage the extension assembly 160.

In some implementations, the motor 32 can move the engaging extension 9*a* to couple the chain 9 to the extension assembly 160. In some implementations, the motor 32 can move the engaging extension 9*a* to thereby move the extension assembly 160 along the track 8.

In some implementations, the motor 32 is operable to move the chain 9 in a second direction that moves the engaging extension 9*a* away from the extension cart 6.

As described further herein, in some implementations, the motor 32 is operable to move the chain 9 in the first direction to thereby extend the roller blind sheet 130 from the roller tube 5. In some implementations, the motor 32 is operable to move the chain 9 in the second direction to thereby retract the roller blind sheet 130 onto the roller tube 5.

As shown in FIGS. 16a and 16b, in some implementations, the motor assembly 180 further comprises a motor connector 34 and a motor key 34b. In some implementations, the motor connector 34 extends the rotation of the motor shaft, through the motor key 34b, to the second sprocket 30, described above with respect to the chain assembly 140.

In some implementations, the sprocket 30 and the motor connector 34, along with the motor key 34b, are connected together and rotate in unison at the same angular velocity with the motor 32, which is also connected to the motor connector 34.

As shown in FIG. 16b, in some implementations, the motor connector 34 comprises screw holes 34a on the top side that align with a motor coupling 33.

In some implementations, the motor connector 34 can be connected to the motor coupling 33 in various ways, such as by nuts and bolts, screws, or rivets.

In some implementations, the motor coupling 33 can be connected to the shaft of the motor 32 in various ways, such as by set screws.

In some implementations, the motor connector 34 and the motor key 34b are configured to provide sufficient torsional strength to transfer the torque of the motor 32 to the sprocket 30 to thereby move the chain 9.

In some implementations, the motor connector 34 and the motor key 34b are long enough and narrow enough to position the motor 32 out of the path of the cart 6 and the attached roller blind sheet 130. In some implementations, the motor connector 34 and the motor key 34b are also long enough and narrow enough to allow a further length of travel of the extension assembly 160 and the attached roller blind sheet 130 toward the extended side 2c.

In some implementations, the bottom portion of the motor key 34b fits snuggly in the center of the sprocket 30.

In some implementations, the sprocket 30 can be tightened to the bottom portion of the motor key 34b in various ways, such as with set screw(s).

In some implementations, the motor 32 may be an alternating current (AC) or direct current (DC) motor. In some implementations, the motor 32 can be any other suitable type of motor.

In some implementations, the motor 32 can be powered in various ways, such as by a battery, a battery pack, or an AC power source, which may include an AC/DC power adapter or inverter.

In some implementations, the motor 32 has a bi-directional or reversible rotation.

In some implementations, the motor 32 is attached to the frame extended side 2c in a position that does not interfere with other components of the roller blind assembly 100 such as the chain 9, engaging extension 9a, cart 6, or the track 8.

As shown in FIGS. 16a and 16b, in some implementations, the motor 32 may attach to the frame extended side 2c by a mounting bracket 35 and a motor plate 35a. In some implementations, the motor 32 may attach to the roller assembly frame 110 in any other suitable way.

In some implementations, as the motor 32 rotates in the applicable direction, e.g. clockwise or counter-clockwise, the motor 32 extends or retracts the roller blind sheet 130 through the various connections and operations of the components of the roller blind assembly 100 described herein.

That is, in some implementations, the motor 32 allows the automated operation of the assembly 100 to extend or retract the roller blind sheet 130.

However, in some implementations, the operation of the roller blind assembly 100 may be performed manually or in any other suitable manner. For example, in some implementations, a crank, handle, or other manual control (not shown) may be connected to the assembly 100 instead of the motor 32, as described herein, to allow the manual operation of the assembly 100 to extend or retract the roller blind sheet 130.

As shown in FIGS. 13a-13d, in some implementations, the roller blind assembly 100 further comprises a first limit switch 37 and a second limit switch 39. In some implementations, the first limit switch 37 and the second limit switch 39 are each attached to the frame 110.

In some implementations, the first limit switch 37 is positioned adjacent to the track 8 to be activated by the extension assembly 160. In some implementations, the first limit switch 37 is positioned to be activated when the extension assembly 160 has been moved along the track 8 to fully extend the roller blind sheet 130 across the frame 110.

In some implementations, the first limit switch 37 when activated causes the motor 32 to stop moving the extension assembly 160 along the track 8.

In some implementations, the second limit switch 39 is positioned adjacent to the track 8 to also be activated by the extension assembly 160. In some implementations, the second limit switch 39 is positioned to be activated when the extension assembly 160 has been moved along the track 8 by the roller blind sheet 130 being fully retracted from across the frame 110.

In some implementations, the second limit switch 39 when activated causes the motor 32 to stop operating.

In some implementations, the limit switches 37, 39 prevent the motor 32 from continuing to drive the chain 9 after the roller blind sheet 130 has been fully extended or fully retracted by the motor 32. For example, in some implementations, the limit switches 37, 39 send a signal to a motor circuitry, described below, to stop the operation of the motor 32 after the roller blind sheet 130 has been fully extended or fully retracted.

In some implementations, the limit switches 37, 39 may be any suitable limit switch that can be used for the roller blind assembly 100. In some implementations, other suitable switches can be used instead or in addition to the limit switches 37, 39, such as a switch or other component that senses the operation of the roller tube 5 with respect to the position of the roller blind sheet 130.

As shown in FIGS. 13a-13d, in some implementations, the roller blind assembly 100 comprises limit switch brackets 38, 40. In some implementations, the brackets 38, 40 are used to mount the limit switches 37, 39 in the roller blind assembly 100.

In some implementations, the brackets 38, 40 are used to mount the limit switches 37, 39 respectively on the extended side 2c and retracted side 2a of the roller blind assembly 100.

In some implementations, the brackets 38, 40 are designed to position the limit switches 37, 39 to work and interact with the extension assembly 160 relative to the position of the roller blind sheet 130, such as fully extended or retracted.

In some implementations, the brackets 38, 40 are also designed to position the limit switches 37, 39 to prevent interference between the limit switches 37, 39, the brackets 38, 40, and other components of the roller blind assembly 100.

In some implementations, the brackets 38, 40 can be attached to the frame of the roller blind assembly 100, or to the extended side track bracket 11 or the retracted side track bracket 12, in various ways, such as by screws, nails, or adhesive.

As introduced above and shown in FIG. 14*a*, in some implementations, the extension assembly 160 comprises a limit switch extension 17 attached to the cart 6. In some implementations, the extension 17 interacts, e.g. engages, with the limit switches 37, 39 during operation of the roller blind assembly 100 as described herein.

In some implementations, the roller blind assembly 100 further comprises a motor controller or motor controller circuitry. In some implementations, the motor controller is housed in a circuitry box 190 (such as shown in FIG. 6) or otherwise attached to the frame 110.

In some implementations, the motor controller can be mounted in any suitable location of the roller blind assembly 100 such that it does not interfere with other parts of the assembly 100, such as the extension and retraction of the roller blind sheet 130. For example, in some implementations, the motor controller is mounted in the circuitry box 190 that is attached to the frame extended side 2*c*.

In some implementations, the motor controller is configured to control the operation of the motor 32, actuator 70, and clutch 72. In some implementations, the motor controller may be further configured to control the operation of any other suitable components of the roller blind assembly 100.

In some implementations, the motor controller may comprise any suitable component to control the operation of the motor 32, actuator 70, clutch 72, and/or any other suitable components of the roller blind assembly 100.

In some implementations, the motor controller allows a manual operation of the foregoing components (i.e., the motor 32, actuator 70, clutch 72, and/or any other suitable components of the roller blind assembly 100). In some implementations, the motor controller allows an automatic operation of the foregoing components.

In some implementations, the motor controller allows a local operation of the foregoing components. In some implementations, the motor controller allows a remote operation of the foregoing components.

In some implementations, the motor controller allows such operation of the foregoing components to extend or retract the roller blind sheet 130.

For example, in some implementations, the motor controller can be operated by a remote control. As another example, in some implementations, the motor controller can be operated by a wired switch configuration.

In some implementations, the motor controller can control the motor 32 to operate, i.e. rotate, in both directions.

In some implementations, the motor controller uses the limit switches 37, 39, described above, in order to control the foregoing components. For example, in some implementations, the motor controller uses the limit switches 37, 39 to start or stop the operation of one or more of the foregoing components when the roller blind sheet 130 is in a certain position, such as fully or partly extended or retracted.

As described above, in some implementations, the motor 32 (as well as the actuator 70, clutch 72, and/or any other suitable components of the roller blind assembly 100) may be powered by various power sources, such as a battery or battery pack. In some implementations, the battery or battery pack may also be housed in the circuitry box 190.

Figure 18A:
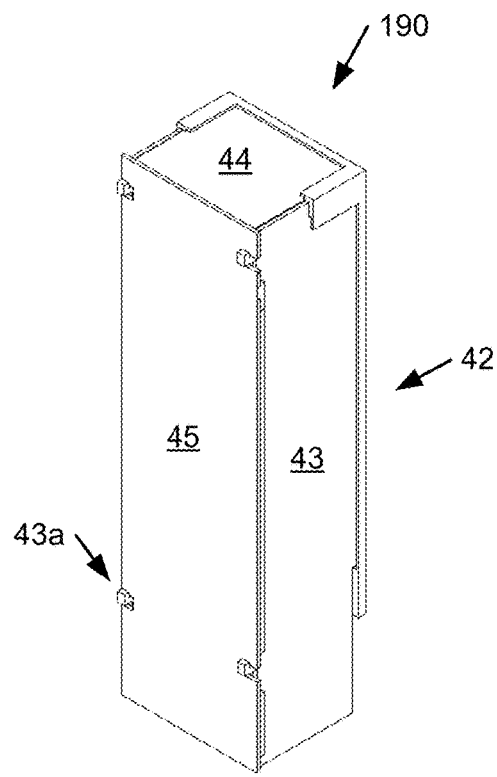
FIGS. 18a and 18b illustrate a perspective view and a corresponding exploded view respectively of the circuitry box of the roller blind assembly according to the present disclosure.
Figure 18B:
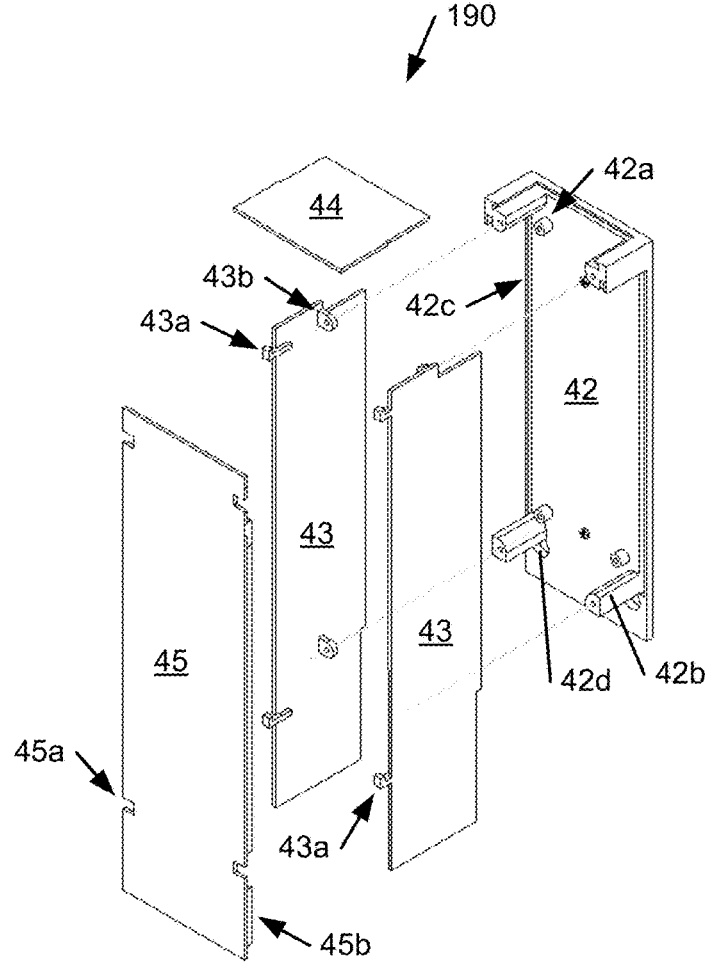

FIGS. 18*a* and 18*b* illustrate a perspective view and a corresponding exploded view respectively of the circuitry box 190 of the roller blind assembly 100 according to the present disclosure.

As shown in FIG. 18*b*, in some implementations, the circuitry box 190 comprises a circuitry bracket 42. In some implementations, the circuitry box 190 is mounted to the frame extended side 2*c* by the circuitry bracket 42. In some implementations, the circuitry box 190 is mounted to the frame extended side 2*c* above the motor plate 35*a* of the motor assembly 180.

In some implementations, the circuitry bracket 42 comprises raised mounting points 42*a* to which the motor controller circuitry or other suitable circuit card (e.g., circuit board) is mounted and/or attached. In some implementations, the raised mounting points 42*a* are configured to secure the circuit card and also to prevent any solder points or other components of the circuit card from interfering with the circuitry bracket 42.

As shown in FIG. 18*b*, in some implementations, the circuitry bracket 42 also comprises a wire pass-through 42*d*. In some implementations, the wire pass-through 42*d* allows wires for the limit switches 37, 39 and the actuator 70, to pass between the inside and the outside of the frame 110, 2*c*.

In some implementations, the circuitry bracket 42 also comprises raised columns 42*b*. In some implementations, the circuitry box 190 also comprises walls 43 having flanges 43*b*. In some implementations, the flanges 43*b* are configured to position on the columns 42*b*.

In some implementations, the circuitry bracket 42 also comprises grooves 42*c*. In some implementations, the grooves 42*c* are configured to receive the edges of the circuitry box walls 43 and the circuitry box top 44 and to help support the components 43, 44 in position.

In some implementations, the wall flanges 43*b* are further configured to have a battery pack or battery circuit card mounted upon and/or attached thereto with the flanges 43*b* positioned on the columns 42*b*.

In some implementations, the flanges 43*b* and columns 42*b* are also configured such that fasteners (such as screws) can be inserted through a battery pack or battery circuit card and through the flanges 43*b* into the columns 42*b* to hold the circuit box 190 and the components housed therein together.

In some implementations, the flanges 43*b* and columns 42*b* are also configured such that the positioning of a battery pack or battery circuit card thereon helps prevent physical interference between it and the motor controller circuit card positioned on the raised mounting points 42*a*.

As shown in FIG. 18*b*, in some implementations, the circuitry box walls 43 comprise hook-like extensions 43*a*. In some implementations, the circuitry box 190 also comprises a cover 45 having openings 45*a*. In some implementations, the extensions 43*a* align with the cover openings 45*a* to attach the cover 45 to the walls 43.

In some implementations, the attachment of the cover 45 by the openings 45*a* and the extensions 43*a* also allows the cover 45 to be openable and closeable to access power supply batteries mounted in the circuitry box 190.

In some implementations, the cover 45 also comprises flanges 45*b* that extend from the surface of the cover 45. In some implementations, the flanges 45*b* are configured to receive the edges of the circuitry box walls 43 to help support the walls 43 in position, similar to the above-described grooves 42*c*.

In some implementations, the circuitry box 190 further comprises an open bottom side, opposite the top 44, that provides a clear path between the motor 32 and the circuitry housed in the circuitry box 190.

In some implementations, the circuitry box 190 is further configured to partly house the motor 32 within the open bottom side of the circuitry box 190 below the circuitry housed in the circuitry box 190.

In some implementations, the circuitry box 190 also minimizes the visibility or conceals the enclosed circuitry, the motor 32, etc. for aesthetic appearance of the roller blind assembly 100.

In some implementations, the circuitry box 190 can be attached to the frame 110, 2c of the roller blind assembly 100 in various ways, such as by screws, nails, or adhesive.

In some implementations, the circuitry box 190 may comprise any other suitable configuration such that it can function as described herein.

Although the components of the roller blind assembly 100 are described herein as attached, coupled, or otherwise connected to the frame 110, in some implementations, one or more of the components may not be connected as such to the frame 110. For example, in some implementations, one or more of the components of the roller blind assembly 100 may be attached or otherwise connected to the angled architectural opening, e.g. to the frame thereof, to which the roller blind assembly 100 is installed. In some implementations, all of the components of the roller blind assembly 100 may be attached or otherwise connected to the angled architectural opening to which the roller blind assembly 100 is installed instead of being attached or otherwise connected to the frame 110, which can thereby be omitted from the assembly 100.

Furthermore, in some implementations, the roller blind assembly 100 may be permanently or temporarily installed to an angled architectural opening. For example, in some implementations, the roller blind assembly 100 may be removable and reinstallable to the angled architectural opening by detaching and reattaching respectively the frame 110 from/to the angled architectural opening with the other components attached or otherwise connected to the frame 110.

In some implementations, the roller blind assembly 100 can have any suitable dimensions.

In some implementations, the roller blind assembly 100 is composed of any suitable materials.

In some implementations, the roller blind assembly 100 can have any suitable appearance.

Figure 20:
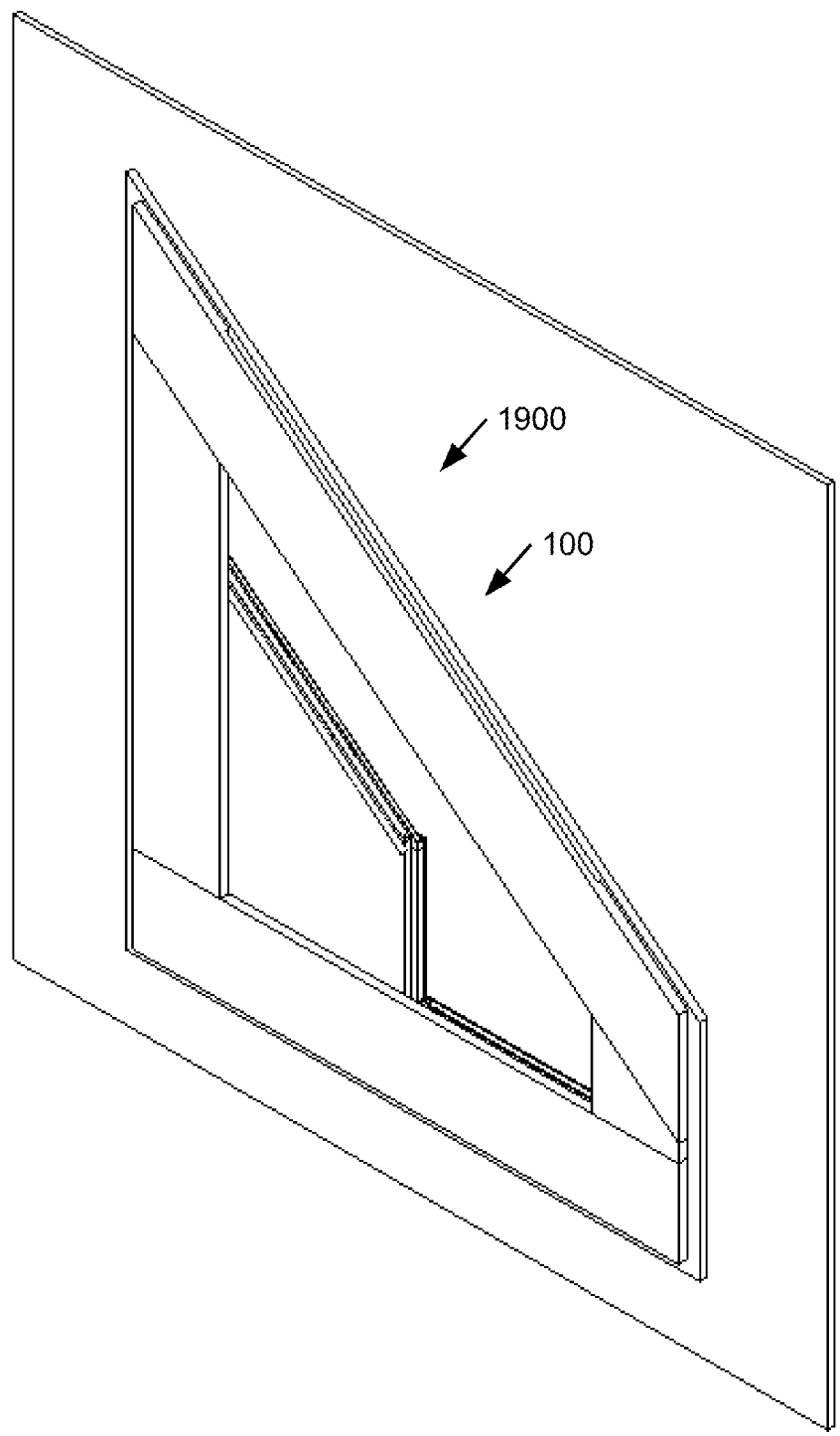
FIG. 20 illustrates a front side or interior side perspective view of the roller blind assembly according to the present disclosure installed in the example angled architectural opening.

In some implementations, an example method of using the roller blind assembly 100 comprises installing the roller blind assembly 100 to a window having a modified rectangular shape, as described above. In some implementations, the roller blind assembly 100 is installed by attaching the frame 110 of the roller blind assembly 100 to the window (e.g., the frame of the window). For example, FIG. 20 illustrates a front side or interior side perspective view of the roller blind assembly 100 installed in an example angled architectural opening 1900 such as a window, as described above.

In some implementations, the frame 110 is attached so that the frame 110 fully fits the perimeter of the window. In some implementations, the frame 110 is attached so that the roller blind sheet 130 fully covers the opening of the window when the roller blind sheet 130 is fully extended across the opening.

For example, in some implementations, the frame 110 is attached so that the first side 2a of the frame 110 is adjacent to the first side of the window, the second side 2c of the frame 110 is adjacent to the second side of the window, and the bottom side 2b of the frame 110 is adjacent to the bottom side of the window.

In some implementations, the method further comprises covering the opening of the window with the roller blind sheet 130 by operating the motor 32 to move the chain 9 in a first direction, as described above.

In some implementations, the engaging extension 9a is thereby moved toward the extension assembly 160. In some implementations, the extension assembly 160 is thereby engaged by the engaging extension 9a. In some implementations, the chain 9 is thereby coupled to the extension assembly 160.

In some implementations, the extension assembly 160 is thereby moved along the track 8. In some implementations, the roller blind sheet 130 is thereby unrolled from the tube 5 and extended horizontally across the opening of the window. In some implementations, the opening of the window is thereby covered by the roller blind sheet 130.

In some implementations, the method further comprises uncovering the roller blind sheet 130 from the opening of the window by operating the motor 32 to move the chain 9 in a second direction, as described above.

In some implementations, the engaging extension 9a is thereby moved away from the extension assembly 160. In some implementations, the extension assembly 160 is thereby disengaged from the engaging extension 9a.

In some implementations, the chain 9 is coupled to the roller tube 5 by the actuator and clutch assembly 170 (as described further below) such that the roller tube 5 is rotated by the operation of the motor 32.

In some implementations, the rotation of the roller tube 5 causes the roller blind sheet 130 to retract and roll up the roller blind sheet 130 onto the roller tube 5. In some implementations, the opening of the window is thereby uncovered by the roller blind sheet 130.

In some implementations, an example method of operation of the roller blind assembly 100 comprises rotating the motor 32 in the applicable direction to extend the roller blind sheet 130. In some implementations, the rotation of the motor 32 causes the extended side sprocket 30 to rotate by the rotation of the motor connector 34 and motor key 34b. In some implementations, the rotation of the sprocket 30 causes the attached chain 9 to travel in the associated direction in the path around the track 8.

In some implementations, as the chain 9 travels, the engaging extension 9a travels with the chain 9. In some implementations, when the engaging extension 9a reaches the extension cart 6, the engaging extension 9a slides into the cutout 6d on the extension cart 6 until it reaches the end of the cutout 6d.

In some implementations, as the chain 9 continues to travel, the engaging extension 9a pushes the extension cart 6 in the extend direction of the assembly 100. In some implementations, as the extension cart 6 is pushed in the extend direction, the roller blind sheet 130 is pulled by the extension cart 6 at the coupling of the extension cart rod 7 inserted into the roller blind sleeve 1b.

In some implementations, as the roller blind sheet 130 is moved by the extension cart 6, it unwinds or unrolls from the roller tube 5.

In some implementations, an example method of operation of the roller blind assembly 100 comprises rotating the motor 32 in the applicable direction to retract the roller blind sheet 130. In some implementations, the rotation of the motor 32 causes the extended side sprocket 30 to rotate by the rotation of the motor connection 34 and motor key 34b.

In some implementations, the rotation of the sprocket 30 causes the attached chain 9 to travel in the associated direction in the path around the track 8.

In some implementations, as the chain 9 travels, the engaging extension 9a on the chain 9 travels with the chain 9. In some implementations, the engaging extension 9a slides out of the cutout 6d on the extension cart 6 and travels away from the extension cart 6.

In some implementations, the engaging extension 9a is moved sufficiently such that the engaging extension 9a and the cart do not engage while the roller blind sheet 130 is retracted.

In some implementations, the actuator 70 is then extended such that the clutch 72 is extended toward the cover 76 and the retracted side sprocket 28. In some implementations, the clutch 72 is extended such that the clutch teeth 72a extend through the bottom attachment cutouts 22d and into the sprocket cover cutouts 76a.

In some implementations, the engagement of the clutch teeth 72a and the sprocket cover cutouts 76a couples the sprocket 28 and the clutch 72 such that movement (e.g., rotation) of the sprocket 28 by the chain 9 also moves (e.g., rotates) the clutch/clutch assembly 72, 170.

In some implementations, the engagement of the clutch teeth 72a and the bottom attachment cutouts 22d couples the bottom attachment 22 and the clutch 72 such that movement (e.g., rotation) of the clutch/clutch assembly 72, 170 (by the chain 9 and sprocket 28) also moves (e.g., rotates) the bottom attachment 22, which thereby moves (e.g., rotates) the roller tube 5 that is attached to the bottom attachment 22.

In this way, in some implementations, the extension of the clutch/clutch assembly 72, 170 by the actuator 70 thereby couples the motor 32, by the chain 9 and the sprocket 28, to the roller tube 5 such that the motor 32 retracts and winds or rolls up the roller blind sheet 130 around the roller tube 5. In some implementations, the retracting of the roller blind sheet 130 also thereby moves the cart 6 to the retracted side 2a by the attached extension rod 7 that extends into the roller blind sleeve 1b on the roller blind extended side 130c.

The FIGURES, including photographs and drawings, comprised herewith may represent one or more implementations of the roller blind assembly.

Details shown in the FIGURES, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A roller blind assembly for covering an opening of a window wherein a top side of the window extends diagonally downward from a first side of the window to a second side of the window so that the top side of the window is non-perpendicular to the first side of the window and the second side of the window and is non-parallel to a bottom side of the window thereby forming a window having a modified rectangular shape, the roller blind assembly comprising:
　a frame comprising a first side, a second side, and a bottom side, wherein:
　　the first side of the frame extends vertically between a first side bottom end and a first side top end;
　　the second side of the frame extends vertically between a second side bottom end and a second side top end;
　　the bottom side of the frame extends horizontally between and is connected respectively to the first side bottom end and the second side bottom end;
　　the first side of the frame is longer than the second side of the frame; and
　　the shape of the frame defined by the first side of the frame, the second side of the frame, and the bottom side of the frame corresponds to the modified rectangular shape of the window so that the frame can fully fit within or adjacent to the perimeter of the window by the first side of the frame extending parallel to the first side of the window, the second side of the frame extending parallel to the second side of the window, and the bottom side of the frame extending parallel to the bottom side of the window;
　a roller tube assembly attached to the frame and comprising a cylindrical tube extending vertically adjacent to the first side of the frame and rotatably attached to the frame so that the tube is rotatable about a longitudinal center of the tube;
　a roller blind sheet comprising a top edge, a bottom edge, a first side edge, and a second side edge that define a shape of the roller blind sheet that corresponds to the modified rectangular shape of the window so that the roller blind sheet covers the opening of the window, wherein:
　　the first side edge of the roller blind sheet is longer than the second side edge;
　　the first side edge of the roller blind sheet is attached to the tube of the roller tube assembly so that the roller blind sheet can be rolled up around the tube and can be unrolled and extended from the tube to respectively uncover and cover the opening of the window; and
　　the top edge of the roller blind sheet is configured to horizontally support the roller blind sheet when extended from the tube and to allow the roller blind sheet to roll up around the tube when retracted;
　a chain assembly attached to the frame and comprising a chain extending in and moveable along a horizontal loop between the first side of the frame and the second side of the frame adjacent to the bottom side of the frame, wherein the chain comprises an engaging extension that comprises a rectangular shaped plate attached to and extending from the chain;

a track assembly attached to the frame and comprising an elongated track member extending between the first side and the second side of the frame;

an extension assembly comprising a rectangular prism shaped body having a plurality of pulleys attached thereto and a rod extending therefrom, wherein:

the extension assembly is moveably connected to the elongated track member by the pulleys of the extension assembly so that the extension assembly can move along the elongated track member between the first side of the frame and the second side of the frame;

the extension assembly is engageably coupleable to the chain by the body of the extension assembly so that a movement of the engaging extension toward the extension assembly by a movement of the chain causes the engaging extension to engage the body of the extension assembly and couple the chain to the extension assembly to move the extension assembly along the elongated track member; and the extension assembly is connected to the roller blind sheet by the rod of the extension assembly adjacent to the second side edge of the roller blind sheet so that a movement of the extension assembly along the elongated track member by the chain causes an unrolling and extending of the roller blind sheet from the tube and horizontally across the frame;

an actuated clutch assembly, wherein:

the actuated clutch assembly is attached to the tube of the roller tube assembly; and the actuated clutch assembly is engageably coupleable to the chain so that a movement of the chain causes a movement of the tube of the roller tube assembly so that the roller blind sheet retracts and rolls up around the tube as the tube is moved by the movement of the chain; and a motor assembly attached to the frame and comprising a motor, wherein:

the motor is coupled to the chain so that the motor can cause the chain to move along the horizontal loop;

the motor is operable to move the chain in a first direction that moves the first engaging extension toward the extension assembly to engage the extension assembly and couple the chain to the extension assembly to move the extension assembly along the elongated track member; and the motor is operable to move the chain in a second direction that moves the tube of the roller tube assembly when the actuated clutch assembly is engagedly coupled to the chain so that the roller blind sheet retracts and rolls up around the tube.

2. The roller blind assembly of claim 1, wherein:

the actuated clutch assembly comprises an actuator and a clutch, wherein the actuator is attached to the clutch and configured to extend the clutch away from the actuator when the actuator is extended and to retract the clutch toward the actuator when the actuator is retracted; and the actuated clutch assembly is positioned within the tube of the roller tube assembly and the actuator is attached to the tube so that the clutch extends towards the chain when the actuator is extended so that the clutch engagedly couples to the chain.

3. The roller blind assembly of claim 1, wherein the track assembly comprises an upper track and a lower track, wherein:

the upper track comprises a pair of rectangular-shaped elongated rods; and the lower track comprises a pair of L-shaped elongated rods.

4. The roller blind assembly of claim 1, further comprising a first limit switch and a second limit switch, wherein:

the first limit switch is attached to the frame and positioned adjacent to the elongated track member to be activated by the extension assembly when the extension assembly has been moved along the elongated track member to fully extend the roller blind sheet across the frame, wherein the first limit switch when activated causes the motor to stop moving the extension assembly along the elongated track member; and the second limit switch is attached to the frame and positioned adjacent to the elongated track member to be activated by the extension assembly when the extension assembly has been moved along the extension track by the roller blind sheet being fully retracted from across the frame, wherein the second limit switch when activated causes the motor to stop moving the tube of the roller tube assembly.

5. The roller blind assembly of claim 1, wherein the roller blind sheet further comprises:

an elongated sleeve adjacent to the top edge of the roller blind sheet; and an elongated piece of material held within the sleeve, wherein the piece of material is configured to provide horizontal support to the roller blind sheet when extended from the tube of the roller tube assembly and allow the roller blind sheet to roll up around the tube when the roller blind sheet is retracted.

6. The roller blind assembly of claim 1, wherein the roller blind sheet further comprises an elongated sleeve adjacent to the second side edge of the roller blind sheet; and the extension assembly further comprises an elongated finger extending upward from the extension assembly to be inserted in the sleeve to connect the extension assembly to the roller blind sheet.

7. The roller blind assembly of claim 1, further comprising a controller attached to the frame, wherein the controller is connected to the motor and the actuated clutch assembly to control the operation of the motor and the actuated clutch assembly to extend or retract the roller blind sheet.

8. The roller blind assembly of claim 1, further comprising a circuitry box attached to the frame and configured to house a power supply of the roller blind assembly that powers the motor and the actuated clutch assembly and to house a controller of the roller blind assembly that controls the operation of the motor and the actuated clutch assembly to extend or retract the roller blind sheet.

9. The roller blind assembly of claim 1, wherein the roller tube assembly further comprises a roller sheet guide attached to the first side of the frame adjacent to the tube of the roller tube assembly, and comprising a roller that partially extends adjacent to the tube so that the roller sheet guide guides and maintains the roller blind sheet firmly around the tube as the roller blind sheet is retracted and rolled up around the tube.

10. The roller blind assembly of claim 1, wherein the roller tube assembly, the chain assembly, the track assembly, and the motor assembly are attached to the frame within an interior of the frame, wherein the interior of the frame extends between the first side, the bottom side, and the second side of the frame.

11. The roller blind assembly of claim 1, further comprising an outer frame comprising an outer first side, an outer second side, an outer top side, and an outer bottom side, wherein:
the outer first side, the outer second side, the outer top side, and the outer bottom side are connected together respectively to form a modified rectangular shape so that the outer first side extends parallel and congruent in length with the first side of the frame, the outer second side extends parallel and congruent in length with the second side of the frame, and the outer bottom side extends parallel and congruent in length with the bottom side of the frame;
the outer frame is attached to the frame so that the outer first side is adjacent to the first side of the frame, the outer second side is adjacent to the second side of the frame, and the outer bottom side is adjacent to the bottom side of the frame; and
the outer frame at least partially conceals the cylindrical tube when the roller blind assembly is viewed toward a direction in which the outer frame is attached to the frame.

12. A method of using a roller blind assembly for covering an opening of a window wherein a top side of the window extends diagonally downward from a first side of the window to a second side of the window so that the top side of the window is non-perpendicular to the first side of the window and the second side of the window and is non-parallel to a bottom side of the window thereby forming a window having a modified rectangular shape, the roller blind assembly comprising:
a frame comprising a first side, a second side, and a bottom side, wherein:
the first side of the frame extends vertically between a first side bottom end and a first side top end;
the second side of the frame extends vertically between a second side bottom end and a second side top end;
the bottom side of the frame extends horizontally between and is connected respectively to the first side bottom end and the second side bottom end;
the first side of the frame is longer than the second side of the frame; and
the shape of the frame defined by the first side of the frame, the second side of the frame, and the bottom side of the frame corresponds to the modified rectangular shape of the window so that the frame can fully fit within or adjacent to the perimeter of the window by the first side of the frame extending parallel to the first side of the window, the second side of the frame extending parallel to the second side of the window, and the bottom side of the frame extending parallel to the bottom side of the window;
a roller tube assembly attached to the frame and comprising a cylindrical tube extending vertically adjacent to the first side of the frame and rotatably attached to the frame so that the tube is rotatable about a longitudinal center of the tube;
a roller blind sheet comprising a top edge, a bottom edge, a first side edge, and a second side edge that define a shape of the roller blind sheet that corresponds to the modified rectangular shape of the window so that the roller blind sheet covers the opening of the window, wherein:
the first side edge of the roller blind sheet is longer than the second side edge;
the first side edge of the roller blind sheet is attached to the tube of the roller tube assembly so that the roller blind sheet can be rolled up around the tube and can be unrolled and extended from the tube to respectively uncover and cover the opening of the window; and
the top edge of the roller blind sheet is configured to horizontally support the roller blind sheet when extended from the tube and to allow the roller blind sheet to roll up around the tube when retracted;
a chain assembly attached to the frame and comprising a chain extending in and moveable along a horizontal loop between the first side of the frame and the second side of the frame adjacent to the bottom side of the frame, wherein the chain comprises an engaging extension that comprises a rectangular shaped plate attached to and extending from the chain;
a track assembly attached to the frame and comprising an elongated track member extending between the first side and the second side of the frame;
an extension assembly comprising a rectangular prism shaped body having a plurality of pulleys attached thereto and a rod extending therefrom, wherein:
the extension assembly is moveably connected to the elongated track member by the pulleys of the extension assembly so that the extension assembly can move along the elongated track member between the first side of the frame and the second side of the frame;
the extension assembly is engageably coupleable to the chain by the body of the extension assembly so that a movement of the engaging extension toward the extension assembly by a movement of the chain causes the engaging extension to engage the body of the extension assembly and couple the chain to the extension assembly to move the extension assembly along the elongated track member; and
the extension assembly is connected to the roller blind sheet by the rod of the extension assembly adjacent to the second side edge of the roller blind sheet so that a movement of the extension assembly along the elongated track member by the chain causes an unrolling and extending of the roller blind sheet from the tube and horizontally across the frame;
an actuated clutch assembly, wherein:
the actuated clutch assembly is attached to the tube of the roller tube assembly; and
the actuated clutch assembly is engageably coupleable to the chain so that a movement of the chain causes a movement of the tube of the roller tube assembly so that the roller blind sheet retracts and rolls up around the tube as the tube is moved by the movement of the chain; and
a motor assembly attached to the frame and comprising a motor, wherein:
the motor is coupled to the chain so that the motor can cause the chain to move along the horizontal loop;
the motor is operable to move the chain in a first direction that moves the first engaging extension toward the extension assembly to engage the extension assembly and couple the chain to the extension assembly to move the extension assembly along the elongated track member; and
the motor is operable to move the chain in a second direction that moves the tube of the roller tube assembly when the actuated clutch assembly is engagedly coupled to the chain so that the roller blind sheet retracts and rolls up around the tube;

the method comprises:

installing the roller blind assembly to the window by attaching the frame of the roller blind assembly to the window whereby the first side of the frame is adjacent to the first side of the window, the second side of the frame is adjacent to the second side of the window, and the bottom side of the frame is adjacent to the bottom side of the window.

13. The method of claim 12, further comprising covering the opening of the window with the roller blind sheet by operating the motor to move the chain in the first direction and thereby:

moving the engaging extension toward the extension assembly;

engaging the extension assembly by the engaging extension;

coupling the chain to the extension assembly;

moving the extension assembly along the elongated track member; and unrolling and extending the roller blind sheet from the tube and horizontally across the opening of the window, thereby covering the opening of the window.

14. The method of claim 13, further comprising uncovering the roller blind sheet from the opening of the window by engagedly coupling the actuated clutch assembly to the chain, operating the motor to move the chain in the second direction, and thereby:

moving the actuated clutch assembly and thereby moving the tube of the roller tube assembly which is attached to the actuated clutch assembly; and retracting and rolling up the roller blind sheet around the tube by the chain moving the tube, thereby uncovering the roller blind sheet from the opening of the window.

* * * * *